US012346947B2

(12) United States Patent
Chida et al.

(10) Patent No.: US 12,346,947 B2
(45) Date of Patent: Jul. 1, 2025

(54) PRODUCT PURCHASE SYSTEM, SERVER, FIRST COMMUNICATION TERMINAL AND SECOND COMMUNICATION TERMINAL

(71) Applicant: SUBARU CORPORATION, Tokyo (JP)

(72) Inventors: Hiroyuki Chida, Tokyo (JP); Takahito Inoh, Tokyo (JP); Yosuke Ohtomo, Tokyo (JP); Mitsuo Aoki, Tokyo (JP); Hiroyuki Suzuki, Tokyo (JP); Kazunori Ozaki, Tokyo (JP); Kazuya Tachimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 358 days.

(21) Appl. No.: 17/849,977

(22) Filed: Jun. 27, 2022

(65) Prior Publication Data

US 2023/0008631 A1 Jan. 12, 2023

(30) Foreign Application Priority Data

Jul. 6, 2021 (JP) .................................. 2021-111921

(51) Int. Cl.
*G06Q 30/0251* (2023.01)
*G06Q 30/0272* (2023.01)
*G06Q 30/0601* (2023.01)

(52) U.S. Cl.
CPC ..... *G06Q 30/0625* (2013.01); *G06Q 30/0261* (2013.01); *G06Q 30/0272* (2013.01)

(58) Field of Classification Search
None
See application file for complete search history.

(56) References Cited

U.S. PATENT DOCUMENTS 10,783,559 B1 * 9/2020 Tran ........................ H04W 4/40
2018/0232770 A1 * 8/2018 Miller ................ G06Q 30/0266
(Continued)

FOREIGN PATENT DOCUMENTS

JP 2004-61259 A 2/2004
JP 2012-130809 A 7/2012
(Continued)

OTHER PUBLICATIONS

H. Lara O'Reilly, "Google patents 'pay-per-gaze' eye-tracking ad technology", retrieved from https://www.marketingweek.com/google-patents-pay-per-gaze-eye-tracking-ad-technology/, available on Aug. 19, 2013 (Year: 2013).*
(Continued)

*Primary Examiner* — Sam Refai
(74) *Attorney, Agent, or Firm* — TROUTMAN PEPPER LOCKE LLP

(57) ABSTRACT

A product purchase system includes a first communication terminal carried by an advertising user, a second communication terminal provided to be movable with a vehicle, and a server. The first communication terminal sends advertisement product information indicating a product worn or held by the advertising user to the server. The second communication terminal sends a product search request including second position information and second time information to the server. The second position information indicates a position of the vehicle when a specific action performed by an occupant in the vehicle is detected while the vehicle is moving. The second time information indicates a clock time when the specific action is detected. The server extracts candidate product information from the advertisement product information, based on the second position information and the second time information. The server then sends the
(Continued)

extracted candidate product information to the second communication terminal.

14 Claims, 15 Drawing Sheets

(56) References Cited

U.S. PATENT DOCUMENTS

| | | | |
|---|---|---|---|
| 2020/0073520 A1* | 3/2020 | Mohan | G06Q 30/0235 |
| 2020/0272830 A1* | 8/2020 | Hamagami | G06Q 20/0855 |
| 2021/0295070 A1* | 9/2021 | Takao | B60W 60/0051 |
| 2022/0155093 A1* | 5/2022 | Fear | G01C 21/3679 |
| 2022/0172249 A1* | 6/2022 | Morrow | G06V 20/59 |

FOREIGN PATENT DOCUMENTS

| | | |
|---|---|---|
| JP | 2013-11483 A | 1/2013 |
| JP | 2018-92341 A | 6/2018 |
| JP | 2020-135760 A | 8/2020 |

OTHER PUBLICATIONS

Notice of Reasons for Refusal issued in Japanese Patent Application No. 2021-111921 dated Nov. 26, 2024, with machine translation.

* cited by examiner

PRODUCT PURCHASE SYSTEM, SERVER, FIRST COMMUNICATION TERMINAL AND SECOND COMMUNICATION TERMINAL

CROSS-REFERENCE TO RELATED APPLICATION

The present application claims priority from Japanese Patent Application No. 2021-111921 filed on Jul. 6, 2021, the entire contents of which are hereby incorporated by reference.

BACKGROUND

The disclosure relates to a product purchase system, a server, and first and second communication terminals.

A technology for imaging an identification symbol with an external-environment imaging camera installed in a vehicle to obtain content related to this identification symbol is known. As a result of relating content including the content of a product to an identification symbol, an occupant in a vehicle can obtain the content including the content of a product by imaging this identification symbol.

For example, Japanese Unexamined Patent Application Publication No. 2020-135760 discloses the following information processing system. A liquid crystal monitor is disposed at a certain location of a store or a commercial facility. An identification symbol to which content including the content of a product is related is displayed on this liquid crystal monitor. By using this information processing system, when a vehicle arrives at a store or a commercial facility, an external-environment imaging camera in the vehicle can image a certain identification symbol displayed on a liquid crystal monitor, thereby making it possible to provide various items of content to an occupant in the vehicle.

SUMMARY

An aspect of the disclosure provides a product purchase system including a first communication terminal, a second communication terminal, and a server. The first communication terminal is configured to be carried by an advertising user. The advertising user serves as a human billboard that advertises a product worn or held by the advertising user. The second communication terminal is provided to be movable with a vehicle. The first communication terminal, the second communication terminal, and the server are capable of coupling to each other via a network so as to communicate with each other. The first communication terminal is configured to send first position information, first time information, and advertisement product information to the server. The first position information indicates a position of the advertising user while the advertising user is moving around. The first time information indicates a clock time when the advertising user is located at the position. The advertisement product information indicates the product. The server is configured to receive the first position information, the first time information, and the advertisement product information from the first communication terminal. The server is configured to store, in a database, the first position information, the first time information, and the advertisement product information received from the first communication terminal while relating the first position information, the first time information, and the advertisement product information to each other. The second communication terminal is configured to detect specific actions performed by an occupant in the vehicle while the vehicle is moving. Each of the specific action represents an intention of the occupant to purchase the product worn or held by the advertising user located around the vehicle. The second communication terminal is configured to record specific action information pieces. The specific action information pieces each including second position information and second time information while relating the second position information and the second time information to each other. The second position information indicates a position of the vehicle when a corresponding one of the specific actions is detected. The second time information indicates a clock time when the corresponding one of the specific actions is detected. Each of the specific action information pieces is recorded for the corresponding one of the specific actions. The second communication terminal is configured to send a product search request to the server in a case where the occupant selects at least one of the recorded specific action information pieces. The product search request includes the second position information and the second time information corresponding to the selected at least one of the specific action information pieces. The server is configured to receive the product search request from the second communication terminal. The server is configured to search the advertisement product information stored in the database and to extract, from the advertisement product information, candidate product information indicating one or more candidate products corresponding to the second position information and the second time information, based on the second position information and the second time information included in the product search request. The server is configured to send the extracted candidate product information to the second communication terminal. The second communication terminal is configured to receive the candidate product information from the server and to display the received candidate product information on a display.

An aspect of the disclosure provides a server that is configured be coupled to a first communication terminal and a second communication terminal via a network so as to communicate with the first communication terminal and the second communication terminal. The first communication terminal is configured to be carried by an advertising user. The advertising user serves as a human billboard that advertises a product worn or held by the advertising user. The second communication terminal is provided to be movable with a vehicle. The server includes at least one processor and at least one memory coupled to the at least one processor. The at least one processor executes a process. The process includes receiving first position information, first time information, and advertisement product information from the first communication terminal. The first position information indicates a position of the advertising user while the advertising user is moving around. The first time information indicates a clock time when the advertising user is located at the position. The advertisement product information indicates the product. The process includes storing, in a database, the first position information, the first time information, and the advertisement product information received from the first communication terminal while relating the first position information, the first time information, and the advertisement product information to each other. The process includes receiving a product search request including second position information and second time information from the second communication terminal. The second position information indicates a position of the vehicle when a specific action performed by an occupant in the vehicle is detected while the vehicle is moving. The specific action represents an intention of the occupant to purchase the product worn or held by the advertising user located around the vehicle. The second time information indicates a clock time when the specific action is detected. The process includes searching the advertisement product information in the database and extracting, from the advertisement product information, candidate product information indicating one or more candidate products corresponding to the second position information and the second time information, based on the second position information and the second time information included in the product search request. The process includes sending the extracted candidate product information to the second communication terminal.

An aspect of the disclosure provides a second communication terminal that is configured to be coupled to a server via a network so as to communicate with the server and is provided to be movable with a vehicle. The server is configured to be coupled to a first communication terminal that is configured to be carried by an advertising user. The advertising user serves as a human billboard that advertises a product worn or held by the advertising user. The second communication terminal includes at least one processor and at least one memory coupled to the at least one processor. The at least one processor executes a process. The process includes detecting specific actions performed by an occupant in the vehicle while the vehicle is moving. Each of the specific actions represents an intention of the occupant to purchase the product worn or held by the advertising user located around the vehicle. The process includes recording specific action information pieces each including second position information and second time information while relating the second position information and the second time information to each other. The second position information indicates a position of the vehicle when a corresponding one of the specific actions is detected. The second time information indicates a clock time when the corresponding one of the specific actions is detected. Each of the specific action information pieces is recorded for the corresponding one of the specific actions. The process includes sending a product search request to the server in a case where the occupant selects at least one of the recorded specific action information pieces. The product search request includes the second position information and the second time information corresponding to the selected at least one of the specific action information pieces. The process includes receiving candidate product information from the server. The candidate product information indicates one or more candidate products corresponding to the second position information and the second time information included in the product search request. The process includes displaying the received candidate product information on a display.

An aspect of the disclosure provides a first communication terminal that is configured to be coupled to a server via a network so as to communicate with the server and is configured to be carried by an advertising user. The advertising user serves as a human billboard that advertises a product worn or held by the advertising user. The server is configured to be coupled to a second communication terminal that is provided to be movable with a vehicle. The first communication terminal includes at least one processor and at least one memory coupled to the at least one processor. The at least one processor executes a process. The process includes sending first position information, first time information, and advertisement product information to the server. The first position information indicates a position of the advertising user while the advertising user is moving around. The first time information indicates a clock time when the advertising user is located at the position. The advertisement product information indicates the product worn or held by the advertising user.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

An occupant in a vehicle during driving may happen to see someone around the vehicle and like a product worn or held by this person and want to buy the same one. After driving, however, the occupant may not be able to recall what the product looks like and fail to buy the same product. It is also not safe for a driver driving a vehicle to focus on a product worn or held by someone outside the vehicle. Moreover, imaging a product worn or held by someone else with a camera may cause some trouble.

It is thus desirable to assist an occupant in a vehicle in purchasing a product worn or held by a person that the occupant happens to see during driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
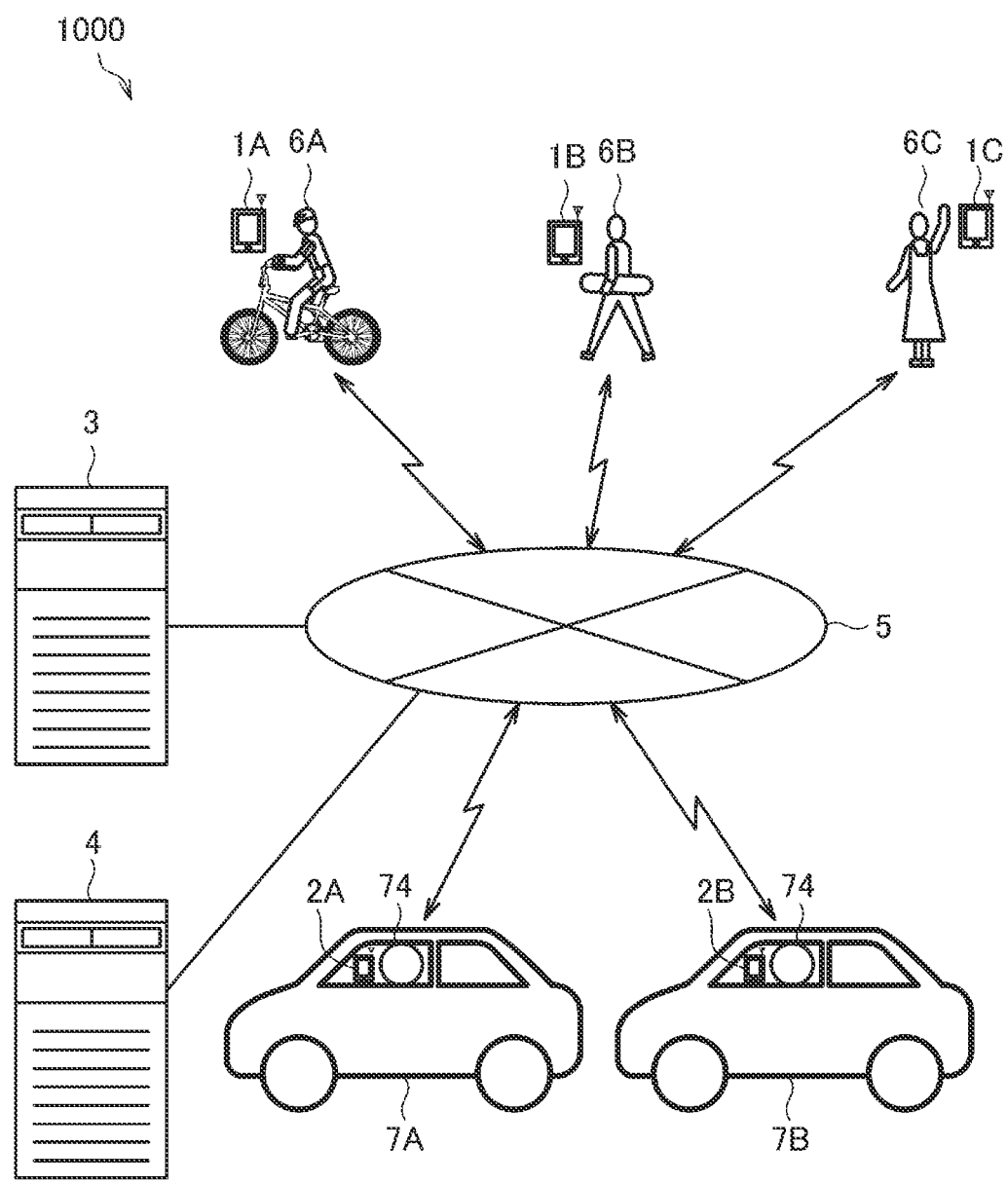
FIG. 1 is a schematic view illustrating a product purchase system according to an embodiment.

The overall configuration of a product purchase system 1000 according to the embodiment of the disclosure will be first described below with reference to FIG. 1. FIG. 1 is a schematic view illustrating the product purchase system 1000 according to the embodiment.

As illustrated in FIG. 1, the product purchase system 1000 includes plural first communication terminals 1A through 1C, plural second communication terminals 2A and 2B, at least one server 3, and a distributor server 4.

Hereinafter, the plural first communication terminals 1A through 1C may also be collectively called the first communication terminal 1 or the first communication terminals 1, while the plural second communication terminals 2A and 2B may also be collectively called the second communication terminal 2 or the second communication terminals 2. The first communication terminal 1, the second communication terminal 2, the server 3, and the distributor server 4 are coupled to each other via a network 5 so as to communicate with each other.

The first communication terminals 1 are mobile communication terminals used by advertising users 6A through 6C. The advertising users 6A through 6C are users serving as human billboards that advertise products and wear or hold advertisements on themselves. Hereinafter, the advertising users 6A through 6C may also be collectively called the advertising user 6 or the advertising users 6. In the embodiment, the first communication terminal 1A is carried by the advertising user 6A, the first communication terminal 1B is carried by the advertising user 6B, and the first communication terminal 1C is carried by the advertising user 6C. The first communication terminals 1 include a wide range of electronic devices that can perform wired or wireless communication with the server 3. Examples of the first communication terminals 1 are smartphones, cellular phones, tablet devices, personal computers (PCs), tablet PCs, game machines, smartwatches, and wearable devices. In the embodiment, it is assumed that a smartphone owned by the advertising user 6 is used as the first communication terminal 1 by way of example.

The second communication terminals 2 are mobile communication terminals that are provided to be movable with vehicles 7A and 7B. Hereinafter, the vehicles 7A and 7B may also be collectively called the vehicle 7 or the vehicles 7. In the embodiment, the second communication terminal 2A is movable with the vehicle 7A, and the second communication terminal 2B is movable with the vehicle 7B. The second communication terminals 2 include a wide range of electronic devices that can perform wired or wireless communication with the server 3. Examples of the second communication terminals 2 are smartphones, cellular phones, tablet devices, PCs, tablet PCs, game machines, smartwatches, and wearable devices. In the embodiment, it is assumed that a smartphone owned by an occupant 74 in the vehicle 7 is used as the second communication terminal 2 by way of example. The second communication terminal 2 is not limited to a mobile communication terminal and may be a terminal device fixed in the vehicle 7 and having a communication function. For example, the second communication terminal 2 may be a navigation terminal or an audio device fixed in the vehicle 7.

The vehicle 7 is an automobile that can drive on the road. The vehicle 7 is an engine vehicle provided with an engine as a driving power source. The vehicle 7 may alternatively be a hybrid vehicle provided with an engine and a motor as driving power sources or an electric vehicle provided with a motor as a driving power source. In the embodiment, it is assumed that the vehicle 7 is a four-wheeled home-use passenger automobile. However, this is only an example and various other types of vehicles: commercial vehicles, such as buses, trucks, and taxis; special vehicles, such as police cars, fire engines, ambulances, tow trucks, snowblowers, and construction vehicles; and two-wheeled motor vehicles may be used as the vehicles 7.

The server 3 is a stored-program digital computer and has a server function. As the server 3, various types of computers, such as a server computer, a PC, a workstation, a mainframe, and a microcomputer, may be used. The configuration of the distributor server 4 is similar to that of the server 3 and an explanation thereof is thus omitted.

The network 5 is a wired or wireless communication network for coupling the first and second communication terminals 1 and 2, the server 3, and the distributor server 4 to each other so that they can communicate with each other. Various types of networks may be used as the network 5. Examples of the network 5 are a satellite communication network (global positioning system (GPS) communication network, for example), a cellular phone network, the internet, a local area network (LAN), a wide area network (WAN), and other dedicated networks. The network 5 at least partially includes a wireless network. The network 5 may also partially include a wired network.

The first and second communication terminals 1 and 2 communicate with the server 3 via the network 5. Likewise, the server 3 communicates with the first and second communication terminals 1 and 2 via the network 5. The server 3 thus includes a communication device that can perform wired or wireless communication with external devices via the network 5. The first and second communication terminals 1 and 2 and the server 3 can share various items of information by communicating with each other via the network 5. The server 3 can provide various functions and services to all or some of the first communication terminals 1. The server 3 can provide various functions and services to all or some of the second communication terminals 2. The vehicle 7 may include a communication device that can perform wired or wireless communication with external devices via the network 5.

In the embodiment, the server 3 collects, stores, and processes information sent from the plural first communication terminals 1A through 1C. The second communication terminal 2 and the server 3 form a client-server system. The second communication terminal 2 (client), which is movable with the vehicle 7 that accommodates a user and is operated by the user, sends various items of information, such as information input by the user, information about the vehicle 7, and environment information around the vehicle 7, to the server 3. The server 3 provides various functions and distributes information to the second communication terminal 2 (client), based on information obtained by storing and processing information collected from the first communication terminals 1A through 1C.

Figure 2:
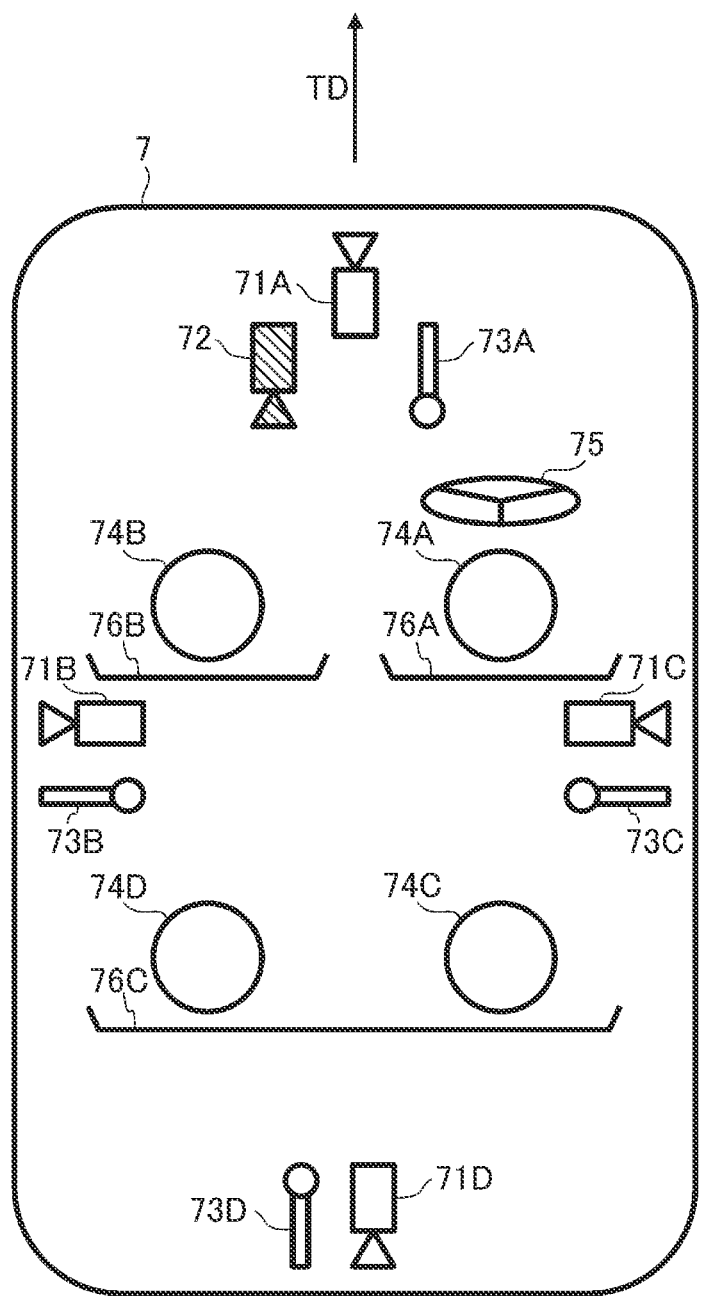
FIG. 2 is a schematic view illustrating an example of the hardware configuration of a vehicle in the embodiment.

The hardware configuration of the vehicle 7 used in the embodiment will be discussed below with reference to FIG. 2. FIG. 2 is a schematic view illustrating an example of the hardware configuration of the vehicle 7 used in the embodiment. As illustrated in FIG. 2, the vehicle 7 includes plural external-environment imaging devices 71A through 71D, an internal-environment imaging device 72, and plural in-vehicle microphones 73A through 73D. Hereinafter, the external-environment imaging devices 71A through 71D may also be collectively called the external-environment imaging device 71 or the external-environment imaging devices 71, and the in-vehicle microphones 73A through 73D may also be collectively called the in-vehicle microphone 73 or the in-vehicle microphones 73. As in the external-environment imaging devices 71A through 71D, plural internal-environment imaging devices 72 may be provided in the vehicle 7.

Plural occupants 74A through 74D are inside the vehicle 7. Hereinafter, the occupants 74A through 74D may also be collectively called the occupant 74 or the occupants 74. For example, the occupant 74A is a driver driving the vehicle 7 and sits in a driver's seat 76A facing a steering wheel 75. The occupant 74B sits in a passenger seat 76B next to the driver's seat 76A. The occupant 74C is located behind the driver occupant 74A and sits in a back seat 76C. The occupant 74D is located behind the occupant 74B and sits in the back seat 76C.

The external-environment imaging device 71 images the external environment around the vehicle 7. The external-environment imaging device 71 is disposed within the compartment of the vehicle 7 and images the external environment around the vehicle 7 while the vehicle 7 is driving or is stopped. The external-environment imaging device 71 may double as a dashboard camera or a camera used for a driving support system, or may be a dedicated camera for the product purchase system 1000 according to the embodiment. The external-environment imaging device 71 captures at least video images, although it may capture still images or video images. Image data obtained by the external-environment imaging device 71 is output to an electronic control unit (ECU) 702 (see FIG. 7), for example, and is recorded on a recording medium if necessary.

The external-environment imaging device 71 images the external environment around the vehicle 7 in the following manner, for example. The external-environment imaging device 71A images the environment in a traveling direction TD of the vehicle 7. The external-environment imaging device 71B images the environment on the left side of the traveling direction TD of the vehicle 7. The external-environment imaging device 71C images the environment on the right side of the traveling direction TD of the vehicle 7. The external-environment imaging device 71D images the environment on the opposite side of the traveling direction TD of the vehicle 7.

The internal-environment imaging device 72 images the inside of the vehicle 7. In one example, the internal-environment imaging device 72 images the occupant 74 inside the vehicle 7. The ECU 702 of the vehicle 7 can detect a gesture made by the occupant 74 by using a known image recognition technology. For example, the ECU 702 can obtain gesture information indicating the motion of a hand or a finger of the occupant 74 by using a known image recognition technology, and can specify a direction pointed by a finger of the occupant 74, for example, based on the obtained gesture information. The internal-environment imaging device 72 images the face of the occupant 74 in the vehicle 7. The ECU 702 obtains face information of the occupant 74 from the image of the face of the occupant 74. The face information may be recognized in any manner. For example, the ECU 702 can obtain the face information by using a known face recognition technology. The ECU 702 then detects a gaze direction of the occupant 74 from the obtained face information. In one example, by analyzing the face information, the ECU 702 detects a line of sight of the occupant 74, calculates the angle and the direction of the line of sight with respect to the traveling direction TD, and then specifies the gaze direction of the occupant 74.

The in-vehicle microphones 73 collect voice in the vehicle 7. The ECU 702 of the vehicle 7 can detect a specific remark of the occupant 74 by using a known voice recognition technology. The ECU 702 can also specify the position and the direction of the face of the speaking occupant 74, for example, based on the volume levels and the time difference represented by plural items of voice data obtained from the plural in-vehicle microphones 73. The in-vehicle microphone 73A collects voice in the traveling direction TD of the vehicle 7. The in-vehicle microphone 73B collects voice on the left side of the traveling direction TD of the vehicle 7. The in-vehicle microphone 73C collects voice on the right side of the traveling direction TD of the vehicle 7. The in-vehicle microphone 73D collects voice on the opposite side of the traveling direction TD of the vehicle 7.

In the embodiment, both of the internal-environment imaging device 72 and the in-vehicle microphone 73 are disposed in the vehicle 7. However, only one of the internal-environment imaging device 72 and the in-vehicle microphone 73 or neither of the internal-environment imaging device 72 nor the in-vehicle microphone 73 may be disposed in the vehicle 7.

Figure 3:
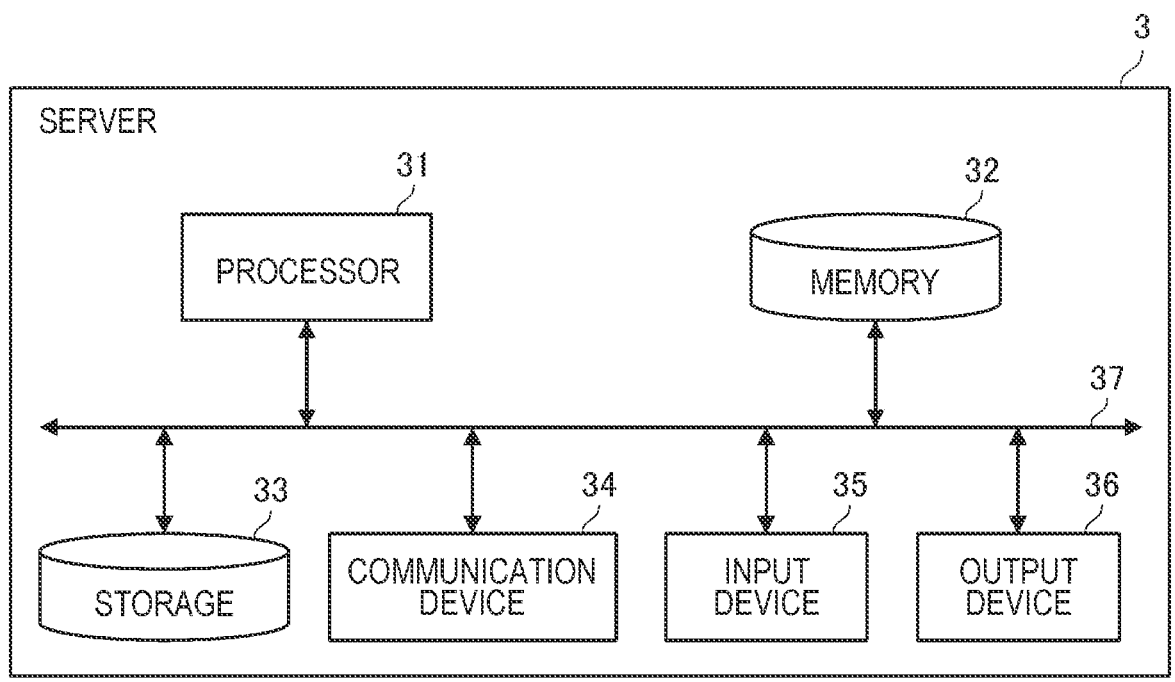
FIG. 3 is a block diagram illustrating an example of the hardware configuration of a server according to the embodiment.

The hardware configuration of the server 3 according to the embodiment will now be described below with reference to FIG. 3. FIG. 3 is a block diagram illustrating an example of the hardware configuration of the server 3 according to the embodiment.

As illustrated in FIG. 3, the server 3 includes a processor 31, a memory 32, a storage 33, a communication device 34, an input device 35, an output device 36, and a bus 37.

The processor 31 is an arithmetic processing unit loaded in a computer. The processor 31 is constituted by a central processing unit (CPU), for example, or may be constituted by another type of microprocessor. The processor 31 may be constituted by one or multiple processors. As a result of the processor 31 executing a program stored in the memory 32 or another storage medium, the server 3 executes various types of processing.

The program is a computer program representing instructions to be executed by the computer. The program may be distributed from an external device via a communication network and be provided to the server 3. The program may be recorded on a non-transitory computer readable medium and be provided to the server 3. As a result of installing the program in the server 3, the server 3 can execute various functions represented by the program.

The memory 32 is a storage medium storing the program and various items of data. The memory 32 includes a random access memory (RAM) and a read only memory (ROM), for example. The ROM is a non-volatile memory storing the program used by the processor 31 and data for operating the program, for example. The RAM is a volatile memory temporarily storing data, such as variables, calculation parameters, and calculation results, used for processing executed by the processor 31. The program stored in the ROM is read into the RAM and is executed by the processor 31, such as a CPU.

The storage 33 is a storage device storing various items of information and data. The storage 33 includes a recording medium and a drive. Examples of the recording medium are a semiconductor memory, a hard disk, and an optical disc. The drive is used for reading and writing data from and into the recording medium. The storage 33 has a larger capacity than the memory 32. The storage 33 may be an internal storage built in the server 3 or an external storage coupled to the server 3 via an external input/output terminal of the server 3. The storage 33 may be an online storage coupled to the server 3 via a communication network.

The communication device 34 is a device that communicates with an external device coupled to the server 3 via a wired or a wireless medium. The communication device 34 establishes communication connection with an external device in accordance with a predetermined protocol and sends and receives various items of information and data with the external device.

The input device 35 is a device used by a user to input information into the server 3. Examples of the input device 35 are a touch sensor, a keyboard, a keypad, a mouse, a remote controller, a button, a switch, and a dial. The input device 35 may include a voice input unit, such as a microphone and a voice recognition module. The input device 35 may also include a remote control module that receives user input from a remote device to remotely control the server 3. Upon receiving an input operation from a user, the input device 35 sends an input signal representing the content of the input operation to the processor 31.

The output device 36 is a device that outputs information and data to the outside of the server 3. The output device 36 includes a display unit that displays information, such as text, graphics, and images, and a voice output unit that outputs voice. The display unit includes a display having a display screen and an image display module. Examples of the display are a liquid crystal display (LCD), a plasma display (PDP), an organic electroluminescence display (OLED), and a cathode ray tube (CRT). The display unit may be a touchscreen provided with a touch sensor on the display screen. The voice output unit includes a speaker and a voice output module.

The bus 37 couples the above-described processor 31, memory 32, storage 33, communication device 34, input device 35, and output device 36 to each other. This enables these devices to send and receive various items of information and data with each other.

Figure 4:
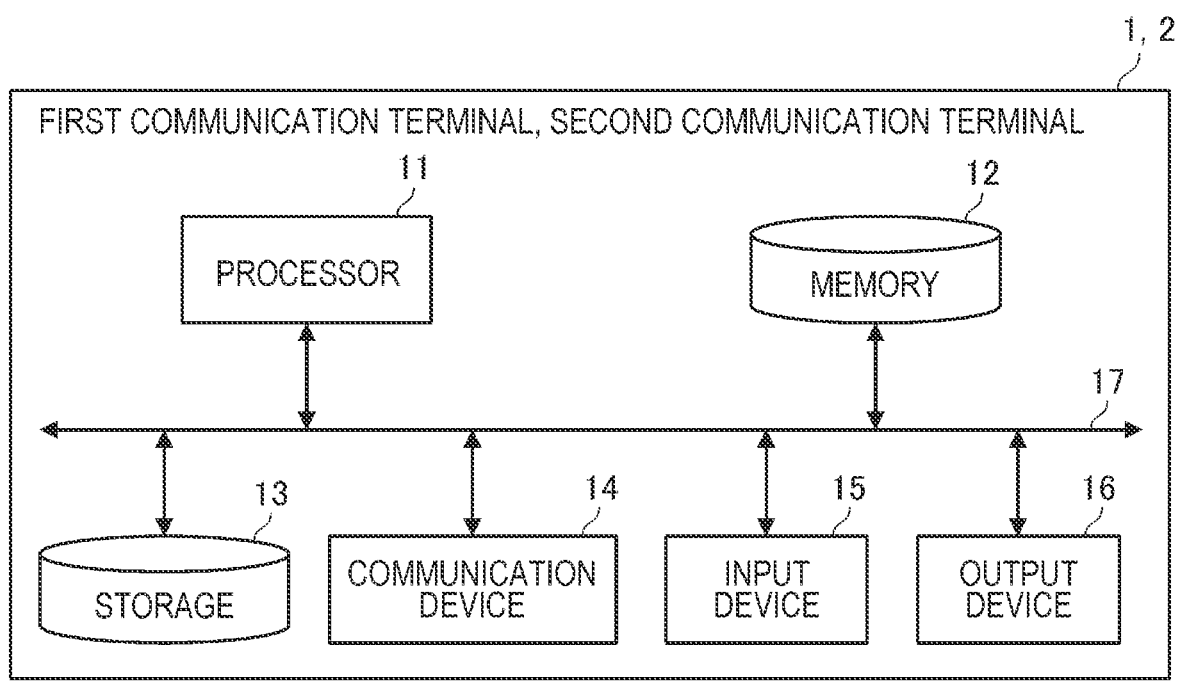
FIG. 4 is a block diagram illustrating an example of the hardware configuration of a first communication terminal according to the embodiment.

The hardware configuration of the first communication terminal 1 according to the embodiment will now be described below with reference to FIG. 4. FIG. 4 is a block diagram illustrating an example of the hardware configuration of the first communication terminal 1 according to the embodiment. The hardware configuration of the second communication terminal 2 is similar to that of the first communication terminal 1 and an explanation thereof will thus be omitted.

As illustrated in FIG. 4, the first communication terminal 1 includes a processor 11, a memory 12, a storage 13, a communication device 14, an input device 15, an output device 16, and a bus 17.

The processor 11, memory 12, storage 13, communication device 14, input device 15, output device 16, and bus 17 of the first communication terminal 1 have substantially the same configurations and functions as the processor 31, memory 32, storage 33, communication device 34, input device 35, output device 36, and bus 37, respectively, of the above-described server 3 (see FIG. 3). A detailed explanation of the individual devices of the hardware configuration of the first communication terminal 1 will thus be omitted.

The hardware configuration of the ECU 702 (see FIG. 7) of the vehicle 7 may be similar to that of the above-described server 3 (see FIG. 3). A detailed explanation and illustration of the individual devices of the hardware configuration of the ECU 702 will thus be omitted.

Figure 5:
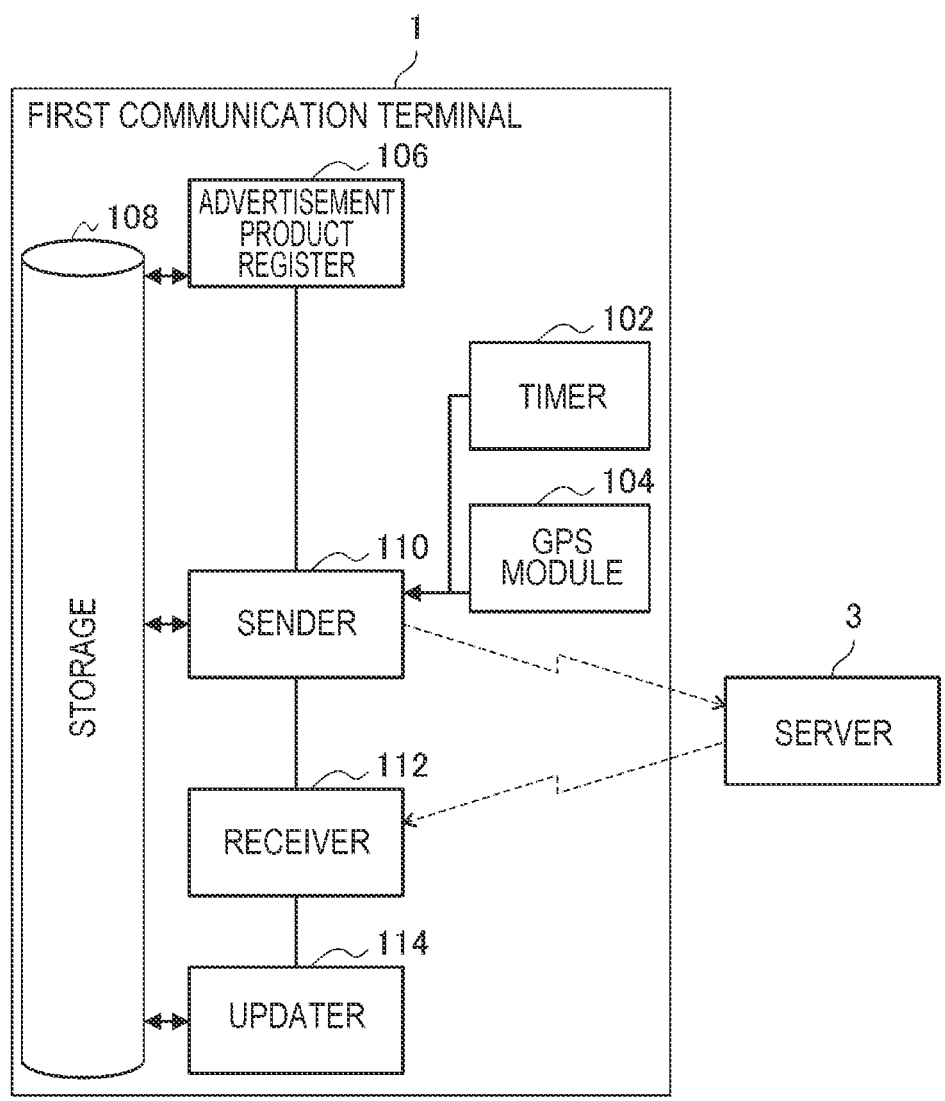
FIG. 5 is a block diagram illustrating an example of the functional configuration of the first communication terminal according to the embodiment.

The functional configuration of the first communication terminal 1 according to the embodiment will now be described below with reference to FIG. 5. FIG. 5 is a block diagram illustrating an example of the functional configuration of the first communication terminal 1 according to the embodiment.

As illustrated in FIG. 5, the first communication terminal 1 sends advertisement product information about a product worn or held by the advertising user 6 to the server 3. The first communication terminal 1 includes a timer 102, a GPS module 104, an advertisement product register 106, a storage 108, a sender 110, a receiver 112, and an updater 114.

The timer 102 has a clock time function of measuring a clock time, such as a current clock time. Time information indicating the current clock time measured by the timer 102 is output to the sender 110 and is recorded in the storage 108 if necessary.

The GPS module 104 is an example of a position detecting device that detects the position of the first communication terminal 1. As a result of the GPS module 104 detecting the position of the first communication terminal 1, the position of the advertising user 6 can be detected. Position information indicating the position of the advertising user 6 detected by the GPS module 104 is sent to the sender 110 and is recorded in the storage 108 if necessary. The position information includes latitude and longitude information, for example. The GPS module 104 constantly measures the position of the first communication terminal 1, that is, the position of the advertising user 6, while the GPS module 104 is powered ON and while the advertising user 6 is moving around, for example.

The advertisement product register 106 registers advertisement product information about a product worn or held by the advertising user 6 in an app installed in the first communication terminal 1, for example.

Figure 6:
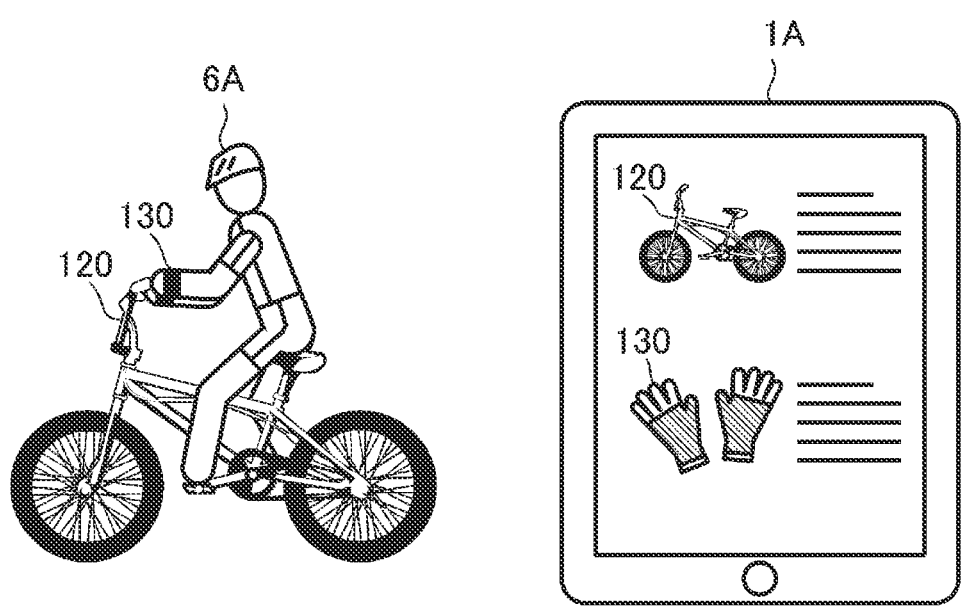
FIG. 6 is a schematic view illustrating a state in which an advertisement product register in the embodiment is registering advertisement product information.

FIG. 6 is a schematic view illustrating a state in which the advertisement product register 106 is registering advertisement product information. As illustrated in FIG. 6, the advertisement product register 106 registers information about a bicycle 120 ridden by the advertising user 6A in the app as advertisement product information. The advertisement product register 106 also registers information about cycling gloves 130 worn by the advertising user 6A in the app as advertisement product information. Advertisement product information registered in the app is recorded in the storage 108 of the first communication terminal 1, for example.

The storage 108 records time information, position information, and advertisement product information. When storing these items of information, the storage 108 may relate them to each other.

The sender 110 obtains time information from the timer 102 and position information from the GPS module 104 in real time. The sender 110 records the obtained time information and position information in the storage 108 by relating them to each other. The sender 110 sends the obtained time information and position information to the server 3 at regular time intervals.

The sender 110 also sends advertisement product information registered by the advertisement product register 106 to the server 3. The sender 110 sends the advertisement product information to the server 3 when it is registered. Alternatively, the sender 110 may send advertisement product information to the server 3 at regular time intervals after the advertisement product information is registered. The sender 110 may send advertisement product information, time information, and position information by relating them to each other. The sender 110 may record advertisement product information, time information, and position information in the storage 108 by relating them to each other. The sender 110 may send advertisement product information, time information, and position information recorded in the storage 108 to the server 3.

In this manner, the sender 110 sends position information indicating a certain position of the advertising user 6 while he/she is moving around, time information indicating the clock time when the advertising user 6 is located at this position, and advertisement product information to the server 3. In one embodiment, the position information may serve as "first position information", while the time information may serve as "first time information".

When a product is purchased based on the advertisement product information registered by the advertising user 6, the receiver 112 receives reward information from the server 3 as advertising revenue. The reward information is point information indicating points that can be used with the app, for example. The reward is not limited to points and may be cash, for example.

When the receiver 112 has received reward information, the updater 114 updates user information related to the advertising user 6. For example, the updater 114 updates point information, which is one item of user information related to the advertising user 6, indicating points that can be used with the app. In one example, when the receiver 112 has received reward information, the updater 114 adds points given by the server 3 to the points held by the advertising user 6. When the advertising user 6 consumes points with the app, the updater 114 subtracts the consumed points from the points held by the advertising user 6. The updater 114 records the updated point information in the storage 108. If the reward is cash, the updater 114 updates cash information held by the advertising user 6 and records the updated cash information in the storage 108.

Figure 7:
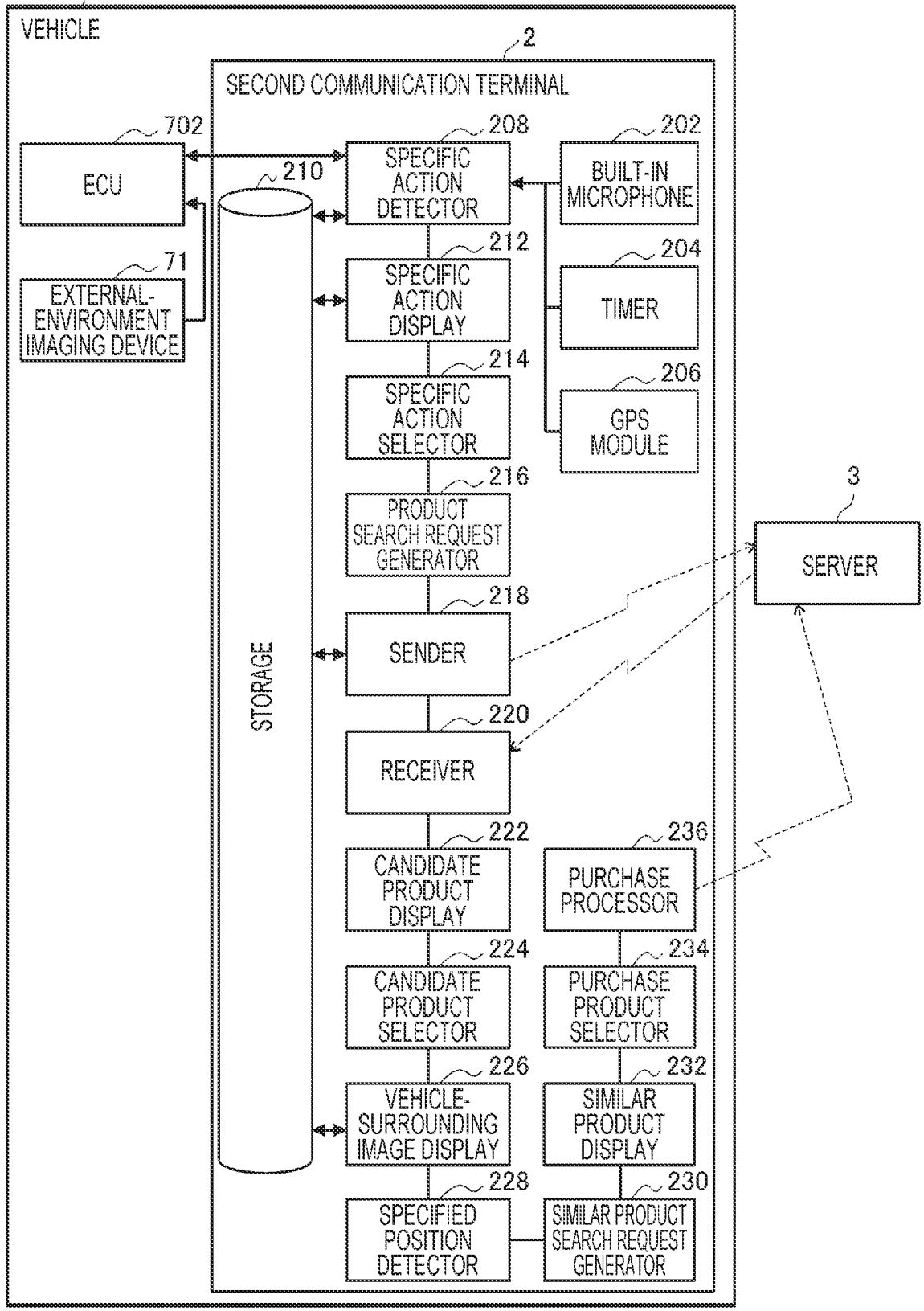
FIG. 7 is a schematic block diagram illustrating an example of the functional configuration of a vehicle and a second communication terminal according to the embodiment.

The functional configuration of the vehicle 7 and the second communication terminal 2 according to the embodiment will now be described below with reference to FIG. 7. FIG. 7 is a schematic block diagram illustrating an example of the functional configuration of the vehicle 7 and the second communication terminal 2 according to the embodiment.

As illustrated in FIG. 7, the vehicle 7 includes the ECU 702. The ECU 702 and the external-environment imaging device 71 are coupled to each other via a wired or wireless medium, for example, so as to communicate with each other.

The ECU 702 is an example of a control unit that controls various devices installed in the vehicle 7. The ECU 702 is constituted by a microcontroller that electronically controls various devices installed in the vehicle 7.

The ECU 702 has a function of communicating with individual devices, such as a control device and an in-vehicle electronic device, installed in the vehicle 7. The ECU 702 sends and receives various types of information to and from the individual devices in the vehicle 7. The communication method between the ECU 702 and these devices may be a controller area network (CAN), for example. The ECU 702 also functions as a communication device that communicates with external devices, such as the second communication terminal 2. The ECU 702 includes a wireless communication device and sends and receives various types of information with external devices, such as the second communication terminal 2. For example, the ECU 702 sends image information indicating images captured by the external-environment imaging device 71 and occupant information collected in the vehicle 7 to the second communication terminal 2.

The second communication terminal 2 includes a built-in microphone 202, a timer 204, a GPS module 206, a specific action detector 208, a storage 210, a specific action display 212, a specific action selector 214, a product search request generator 216, and a sender 218. The second communication terminal 2 also includes a receiver 220, a candidate product display 222, a candidate product selector 224, a vehicle-surrounding image display 226, a specified position detector 228, a similar product search request generator 230, a similar product display 232, a purchase product selector 234, and a purchase processor 236.

The built-in microphone 202 collects voice in the vehicle 7 when the second communication terminal 2 is located inside the vehicle 7. Voice data indicating the voice collected by the built-in microphone 202 is output to the specific action detector 208 and is recorded in the storage 210 if necessary.

The timer 204 has a clock time function of measuring a clock time, such as a current clock time. Time information indicating the current clock time measured by the timer 204 is output to the specific action detector 208 and is recorded in the storage 210 if necessary.

The GPS module 206 is an example of a position detecting device that detects the position of the second communication terminal 2. As a result of the GPS module 206 detecting the position of the second communication terminal 2 disposed in the vehicle 7, the position of the vehicle 7 can be detected. Position information indicating the position of the vehicle 7 detected by the GPS module 206 is sent to the specific action detector 208 and is recorded in the storage 210 if necessary. The position information includes latitude and longitude information, for example.

The specific action detector 208 obtains time information from the timer 204 and position information from the GPS module 206 in real time. The specific action detector 208 also detects a specific action performed by the occupant 74 in the vehicle 7 while the vehicle 7 is moving. The specific action represents an intention of the occupant 74 to purchase a product worn or held by the advertising user 6 located around the vehicle 7.

For example, the specific action detector 208 detects a specific action, based on voice data collected by the built-in microphone 202. The specific action detector 208 can detect a specific remark of the occupant 74 by using a known voice recognition technology. In one example, the specific action detector 208 detects, as a specific action, a specific remark made by the occupant 74 expressing his/her intention to purchase a product worn or held by the advertising user 6 located around the vehicle 7. A specific remark is a specific keyword, such as "I want that". The specific action detector 208 determines that a specific action is performed when a specific remark is made by the occupant 74. A specific action may be detected in a different manner. For example, a specific button or switch may be provided in the second communication terminal 2, and when the button or the switch is pressed, the specific action detector 208 may determine that a specific action is performed.

The specific action detector 208 records specific action information including position information and time information in the storage 210 by relating the position information and the time information to each other. The position information indicates the position of the vehicle 7 when a specific action is detected. The time information indicates a clock time when the specific action is detected. In one embodiment, the position information may serve as "second position information", while the time information may serve as "second time information". The specific action detector 208 records specific action information including the position information and time information related to each other in the storage 210 every time a specific action is detected.

The specific action detector 208 and the ECU 702 are coupled to each other via a wired or wireless medium, for example, so as to communicate with each other. This enables the specific action detector 208 to receive image data indicating an image around the vehicle 7 captured by the external-environment imaging device 71. The specific action detector 208 obtains image data indicating an image around the vehicle 7 when a specific action is detected. In the embodiment, the specific action detector 208 relates image data captured by the external-environment imaging device 71 when a specific action is detected to the corresponding position information and time information and then records these items of information in the storage 210 as specific action information. When image data is obtained, the specific action detector 208 may automatically pixelate or blur out faces included in the image indicated by the image data.

The specific action display 212 displays specific action information recorded in the storage 210 on a display of the second communication terminal 2.

The specific action selector 214 selects at least one item of specific action information as a result of the occupant 74 selecting at least one item of specific action information among one or plural items of specific action information displayed on the display. In other words, the specific action selector 214 selects at least one item of specific action information as a result of the occupant 74 selecting at least one item of specific action information among one or plural items of specific action information recorded in the storage 210. In one example, when the occupant 74 has tapped a certain item of specific action information displayed on the display, the specific action selector 214 selects this item of specific action information.

Figure 8:
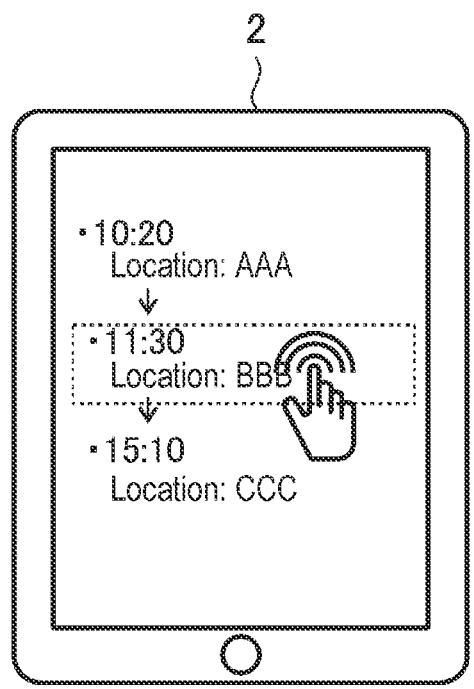
FIG. 8 is a schematic view illustrating a state in which a specific action selector in the embodiment is selecting specific action information.

FIG. 8 is a schematic view illustrating a state in which the specific action selector 214 in the embodiment is selecting a certain item of specific action information. As illustrated in FIG. 8, multiple items of specific action information are displayed on the display of the second communication terminal 2. The specific action information displayed on the display is related to time information ("10:20", for example) and position information ("Location: AAA", for example). The multiple items of specific action information are displayed in chronological order. In FIG. 8, the occupant 74 is tapping the item of specific action information related to time information "11:30" and position information "Location: BBB". The specific action selector 214 selects this item of specific action information tapped by the occupant 74.

When the specific action selector 214 has selected one or multiple items of specific action information, the product search request generator 216 generates a product search request by including position information and time information related to the selected one or plural items of specific action information.

When the specific action selector 214 has selected one or multiple items of specific action information, the sender 218 sends a product search request generated by the product search request generator 216 to the server 3.

The receiver 220 receives one or plural items of candidate product information sent from the server 3 in response to a product search request. Candidate product information is advertisement product information extracted by the server 3 based on the specific action information. Details of candidate product information will be discussed later.

The candidate product display 222 displays one or plural items of candidate product information received by the receiver 220 on the display of the second communication terminal 2.

The candidate product selector 224 selects at least one item of candidate product information as a result of the occupant 74 selecting at least one item of candidate product information among one or plural items of candidate product information displayed on the display. In one example, when the occupant 74 has tapped a certain item of candidate product information displayed on the display, the candidate product selector 224 selects this item of candidate product information. The candidate product selector 224 also determines whether the occupant 74 has selected candidate product information. For example, a button is displayed on the display to indicate that there is no product that the occupant 74 wishes to purchase among multiple items of candidate product information. If this button is pressed, the candidate product selector 224 determines that no candidate product information is selected by the occupant 74. If the occupant 74 has not selected any candidate product information for a certain period of time, the candidate product selector 224 may determine that there is no product that the occupant 74 wishes to purchase among the items of candidate product information.

Figure 9:
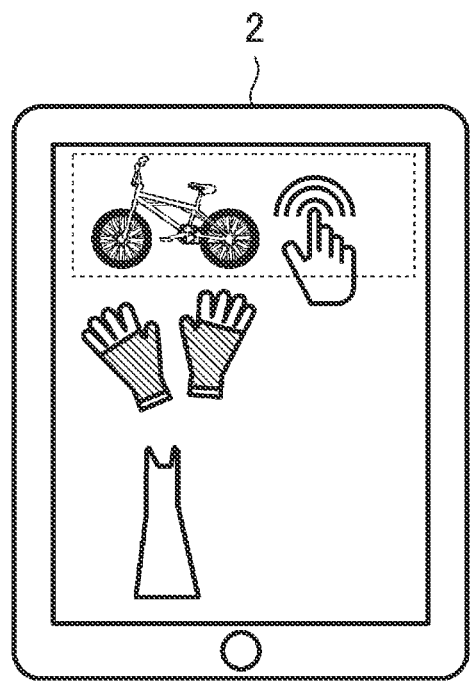
FIG. 9 is a schematic view illustrating a state in which a candidate product selector in the embodiment is selecting candidate product information.

FIG. 9 is a schematic view illustrating a state in which the candidate product selector 224 in the embodiment is selecting candidate product information. As illustrated in FIG. 9, multiple items of candidate product information are displayed on the display of the second communication terminal 2. As the multiple candidate product information, "bicycle", "cycling gloves", and "dress", which are as advertisement products, are displayed on the display. In FIG. 9, the occupant 74 is tapping the candidate product information indicating "bicycle" displayed on the display. At this time, the candidate product selector 224 selects the tapped item of candidate product information. In this manner, as a product that the occupant 74 wishes to purchase, the candidate product selector 224 selects a certain item of candidate product information among plural items of candidate product information displayed on the display.

The vehicle-surrounding image display 226 obtains image data indicating an image around the vehicle 7 recorded in the storage 210. In response to receiving information indicating that there is no product that the occupant 74 wishes to purchase among items of candidate product information displayed on the display, the vehicle-surrounding image display 226 displays the image around the vehicle 7 corresponding to the specific action information selected by the occupant 74.

Within the image around the vehicle 7 displayed on the display, the specified position detector 228 detects the display position of a product specified by the occupant 74. In one example, within the image around the vehicle 7 displayed on the display, the specified position detector 228 detects a position tapped by the occupant 74 as the display position of a product that the occupant 74 wishes to purchase. Alternatively, in the image around the vehicle 7 displayed on the display, the specified position detector 228 may detect a coordinate position specified by the occupant 74 as the display position of a product that the occupant 74 wishes to purchase. The specified position detector 228 also determines whether the occupant 74 has specified any position within the image around the vehicle 7.

Figure 10:
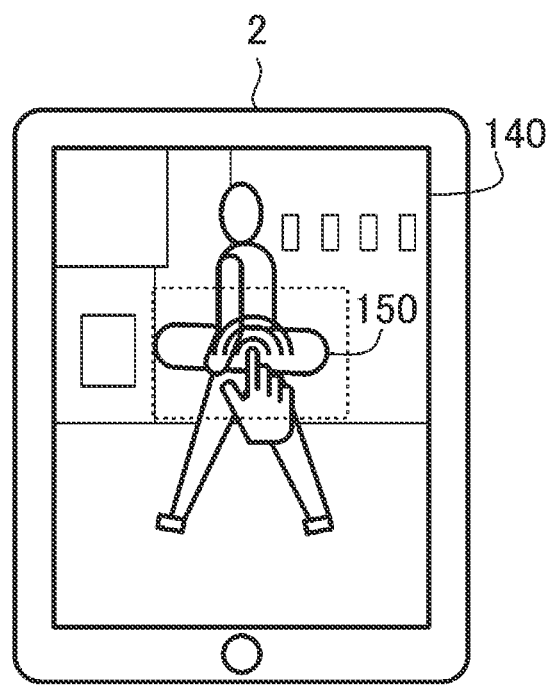
FIG. 10 is a schematic view illustrating a state in which a specified position detector in the embodiment is detecting a display position of a product to be purchased.

FIG. 10 is a schematic view illustrating a state in which the specified position detector 228 is detecting the display position of a product that the occupant 74 wishes to purchase. As illustrated in FIG. 10, a vehicle surrounding image 140 is displayed on the display of the second communication terminal 2. In the vehicle surrounding image 140, "skateboard", which is a product 150 that the occupant 74 wishes to purchase, is displayed. In FIG. 10, the occupant 74 is tapping "skateboard" displayed on the display. At this time, the specified position detector 228 determines the tapped position as the display position of the product 150.

When the specified position detector 228 has detected the display position of the product 150, the similar product search request generator 230 generates a similar product search request by including specified position information indicating the detected display position and at least part of the vehicle surrounding image 140.

When the specified position detector 228 has detected the display position of the product 150, the sender 218 sends a similar product search request generated by the similar product search request generator 230 to the server 3.

The receiver 220 receives one or plural items of similar product information sent from the server 3 in response to a similar product search request. Similar product information is product information indicating one or plural similar products which are identical to or similar to the product 150 and which are extracted by the server 3 based on the specified position information and the vehicle surrounding image 140. Details of the similar product information will be discussed later.

The similar product display 232 displays one or plural items of similar product information received by the receiver 220 on the display of the second communication terminal 2.

The purchase product selector 234 selects at least one item of similar product information as a result of the occupant 74 selecting at least one item of similar product information among one or plural items of similar product information displayed on the display. In one example, when the occupant 74 has tapped a certain item of similar product information displayed on the display, the purchase product selector 234 selects this item of similar product information.

The purchase processor 236 executes purchase processing for the product corresponding to the candidate product information selected by the candidate product selector 224 or the product corresponding to the similar product information selected by the purchase product selector 234. In one example, the purchase processor 236 generates a purchase request by including the selected candidate product information or similar product information and sends the generated purchase request to the server 3. Purchase processing includes payment processing for purchasing a product.

Figure 11:
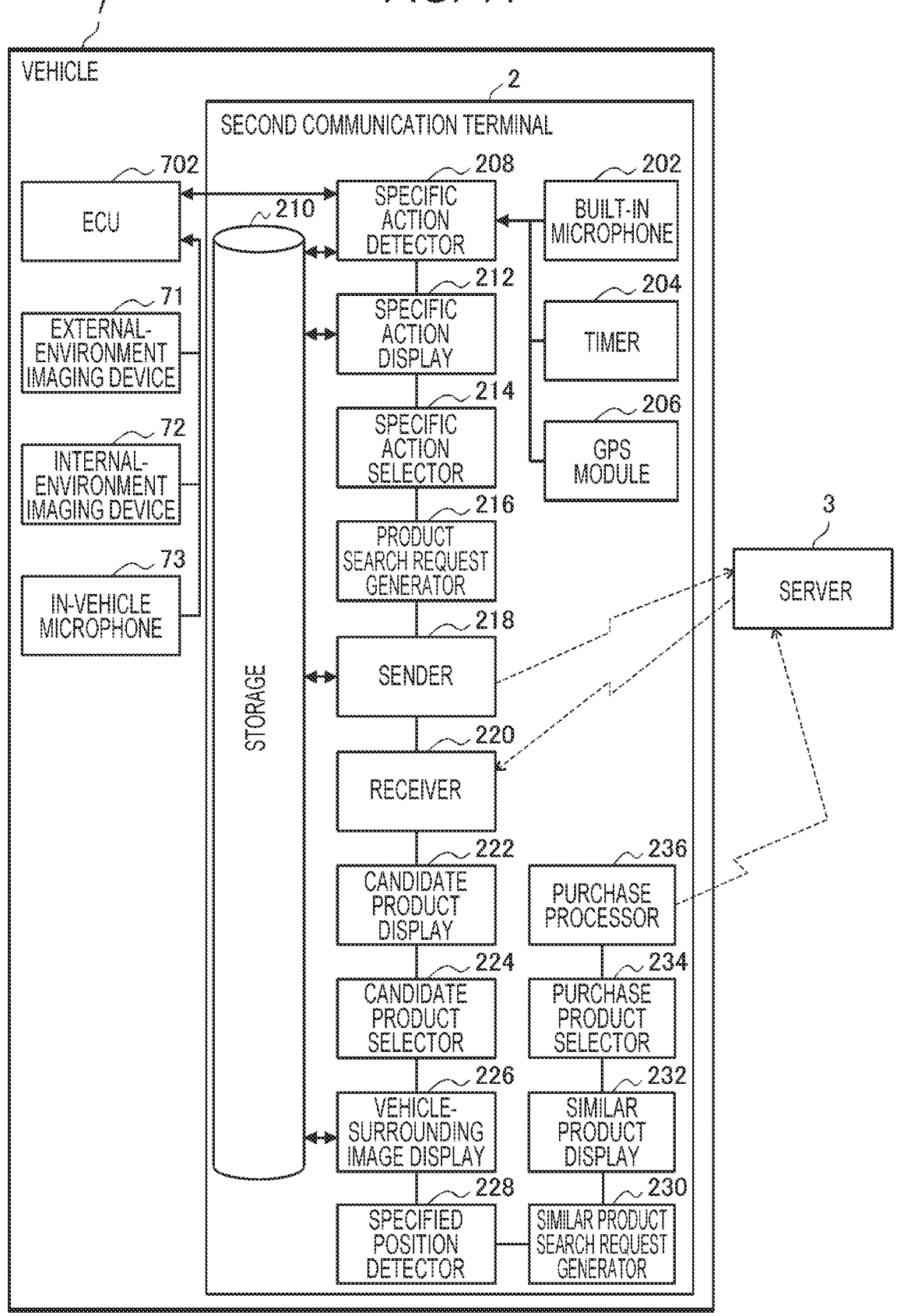
FIG. 11 is a schematic block diagram illustrating an example of the functional configuration of a vehicle and the second communication terminal according to a modified example.

The functional configuration of the vehicle 7 and the second communication terminal 2 according to a modified example will now be described below with reference to FIG. 11. FIG. 11 is a schematic block diagram illustrating an example of the functional configuration of the vehicle 7 and the second communication terminal 2 according to the modified example. Substantially the same elements as those of the vehicle 7 and the second communication terminal 2 according to the embodiment are designated by like reference numerals and an explanation thereof will thus be omitted.

The ECU 702, the external-environment imaging device 71, the internal-environment imaging device 72, and the in-vehicle microphone 73 are coupled to each other via a wired or wireless medium, for example, so as to communicate with each other. The ECU 702 is an example of a state detecting device that detects occupant information about the state of the occupant 74 located in the vehicle 7. The ECU 702 collects occupant information based on information detected by various detecting devices, such as the above-described internal-environment imaging device 72 and in-vehicle microphone 73, installed in the vehicle 7.

The specific action detector 208 and the ECU 702 are coupled to each other via a wired or wireless medium, for example, so as to communicate with each other. This enables the specific action detector 208 to receive image data captured by the internal-environment imaging device 72 and voice data collected by the in-vehicle microphone 73. The specific action detector 208 is thus able to detect a specific action, based on voice data collected by the in-vehicle microphone 73.

The specific action detector 208 is also able to detect a specific action, based on image data indicating the occupant 74 captured by the internal-environment imaging device 72. In one example, the specific action detector 208 detects, as a specific action, a specific gesture or the motion of a line of sight of the occupant 74 which represents an intention of the occupant 74 to purchase a product worn or held by the advertising user 6 located around the vehicle 7. An example of the specific gesture is pointing at the advertising user 6 by the occupant 74. An example of the motion of a line of sight is the motion of gazing at the advertising user 6 by the occupant 74.

In the embodiment, the specific action detector 208 is disposed in the second communication terminal 2. However, this is only an example. For example, a function unit that serves as the specific action detector 208 may be disposed in the ECU 702. In this case, while the vehicle 7 is moving, the ECU 702 may detect a specific action performed by the occupant 74, which represents an intention of the occupant 74 to purchase a product worn or held by the advertising user 6 located around the vehicle 7. Alternatively, the specific action detector 208 and the ECU 702 may collaborate with each other to detect a specific action performed by the occupant 74 located in the vehicle 7 while the vehicle 7 is moving. In this manner, the ECU 702 and the specific action detector 208 may collaborate with each other and function as part of the second communication terminal 2.

The ECU 702 specifies a focusing direction of the occupant 74 having performed a specific action, based on at least one of voice data collected by the in-vehicle microphone 73 or image data of the occupant 74 captured by the internal-environment imaging device 72. The ECU 702 then sends direction information indicating the specified focusing direction to the specific action detector 208.

The specific action detector 208 relates direction information received from the ECU 702 to position information received from the GPS module 206 and time information received from the timer 204 and records these items of information in the storage 210 as specific action information. When the specific action selector 214 has selected one or plural items of specific action information, the product search request generator 216 generates a product search request by including direction information, position information, and time information corresponding to the selected item of specific action information.

When the specific action selector 214 has selected one or plural items of specific action information, the sender 218 sends a product search request generated by the product search request generator 216 to the server 3.

[7. Functional Configuration of Server]

Figure 12:
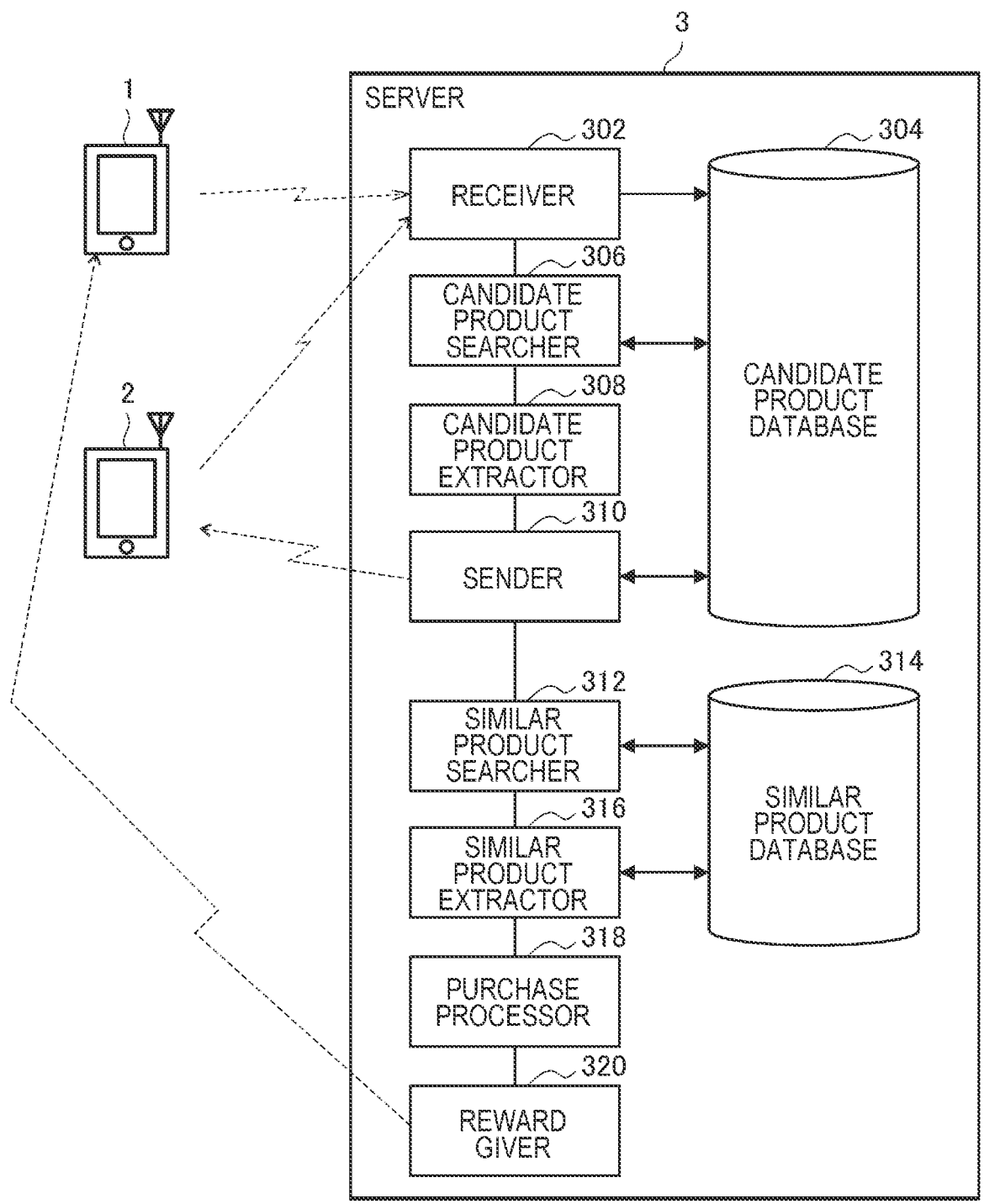
FIG. 12 is a schematic block diagram illustrating an example of the functional configuration of a server according to the embodiment.

The functional configuration of the server 3 according to the embodiment will now be described below with reference to FIG. 12. FIG. 12 is a schematic block diagram illustrating an example of the functional configuration of the server 3 according to the embodiment.

As illustrated in FIG. 12, the server 3 includes a receiver 302, a candidate product database 304, a candidate product searcher 306, a candidate product extractor 308, and a sender 310. The server 3 also includes a similar product searcher 312, a similar product database 314, a similar product extractor 316, a purchase processor 318, and a reward giver 320.

The receiver 302 receives advertisement product information about a product worn or held by the advertising user 6 from the first communication terminal 1. The receiver 302 also receives from the first communication terminal 1 position information indicating a certain position of the advertising user 6 while he/she is moving around and time information indicating the clock time when the advertising user 6 is located at this position. In one embodiment, the position information may serve as "first position information", while the time information may serve as "first time information". The receiver 302 stores the position information, time information, and advertisement product information received from the first communication terminal 1 in the candidate product database 304 by relating these items of information to each other.

The candidate product database 304 records and stores position information, time information, and advertisement product information received from the first communication terminal 1.

The receiver 302 receives from the second communication terminal 2 a product search request including position information indicating the position of the vehicle 7 when a specific action is detected and time information indicating the clock time when the specific action is detected. In one embodiment, the position information may serve as "second position information", while the time information may serve as "second time information".

Upon receiving a product search request, the candidate product searcher 306 searches the candidate product database 304 for advertisement product information, based on the position information and time information included in the product search request.

The candidate product extractor 308 extracts one or plural items of candidate product information representing one or plural candidate products corresponding to the position information and the time information included in the product search request, from among plural items of advertisement product information stored in the candidate product database 304.

In one example, the candidate product searcher 306 compares plural items of first position information and plural items of first time information related to many items of advertisement product information stored in the candidate product database 304 with the second position information and the second time information received from the second communication terminal 2. The candidate product searcher 306 then searches for the first position information and the first time information close to the second position information and the second time information.

In one example, the candidate product searcher 306 searches for one or plural items of first position information indicating the positions within a certain distance from the position indicated by the second position information and also searches for one or plural items of first time information indicating the times within a certain period of time from the time indicated by the second time information. The candidate product extractor 308 then extracts advertisement product information related to the first position information and the first time information close to the second position information and the second time information received from the second communication terminal 2.

This makes it possible to extract the advertising user 6 located near the vehicle 7 at the clock time (second time information) when a specific action is detected in the vehicle 7 and also to extract advertisement product information about a product worn or held by this advertising user 6 as a candidate product.

Upon receiving from the second communication terminal 2 a product search request including direction information indicating a focusing direction of the occupant 74 having performed a specific action, the candidate product extractor 308 extracts advertisement product information, based on the second time information, second position information, and direction information included in the product search request. In one example, the candidate product extractor 308 extracts one or plural items of first position information indicating the positions within a certain distance from the position indicated by the second position information and also extracts one or plural items of first time information indicating the times within a certain period of time from the time indicated by the second time information. The candidate product extractor 308 also extracts first position information corresponding to the position represented by the direction indicated by the direction information as the first position information corresponding to the position indicated by the second position information.

The receiver 302 receives a similar product search request including specified position information and at least part of a vehicle surrounding image 140 from the second communication terminal 2. The specified position information indicates the display position of a product specified by the occupant 74 within the vehicle surrounding image 140.

Upon receiving a similar product search request, the similar product searcher 312 searches the similar product database 314, based on the specified position information and at least part of the vehicle surrounding image 140 included in the similar product search request. In the similar product database 314, various items of product information on various products to be provided by service providers running stores and commercial facilities, for example, are stored.

In one example, based on the specified position information, the similar product searcher 312 identifies the display position of a product to be purchased by the occupant 74 within the vehicle surrounding image 140. The similar product searcher 312 then extracts a partial image within a certain range from the identified display position of the product within the vehicle surrounding image 140. The similar product searcher 312 compares the partial image with product images indicated by many items of product information stored in the similar product database 314. The similar product searcher 312 then searches for products identical to or similar to the product image included in the partial image.

The similar product extractor 316 extracts one or plural items of similar product information indicating one or plural products identical to or similar to the product specified by the occupant 74, from among plural items of product information stored in the similar product database 314.

The sender 310 sends candidate product information extracted by the candidate product extractor 308 to the second communication terminal 2. The sender 310 sends similar product information extracted by the similar product extractor 316 to the second communication terminal 2.

Upon receiving a purchase request including candidate product information or similar product information selected by the occupant 74 from the second communication terminal 2, the purchase processor 318 executes processing for ordering the product corresponding to the candidate product information or similar product information from the distributor server 4.

Upon receiving a purchase request including candidate product information from the second communication terminal 2, the reward giver 320 gives a reward to the advertising user 6 who has registered advertisement product information corresponding to this candidate product information. In one example, the reward giver 320 gives points that can be used with an app to the advertising user 6 as a reward. The reward is not limited to points and may be cash, for example. The reward giver 320 sends reward information representing a reward to be given to the advertising user 6 to the first communication terminal 1.

Figure 13:
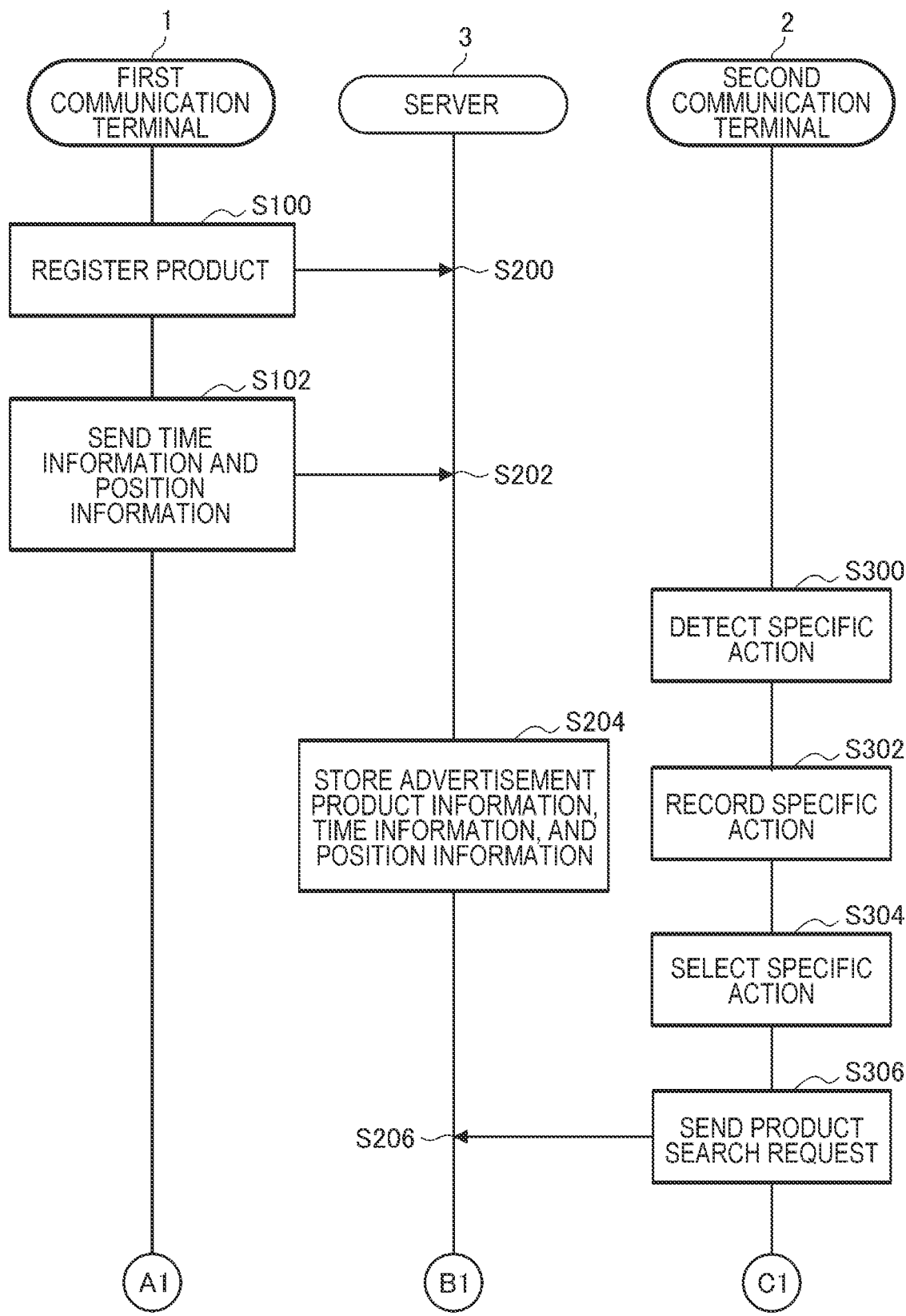
FIG. 13 is a first sequence diagram illustrating processing executed by the product purchase system according to the embodiment.
Figure 14:
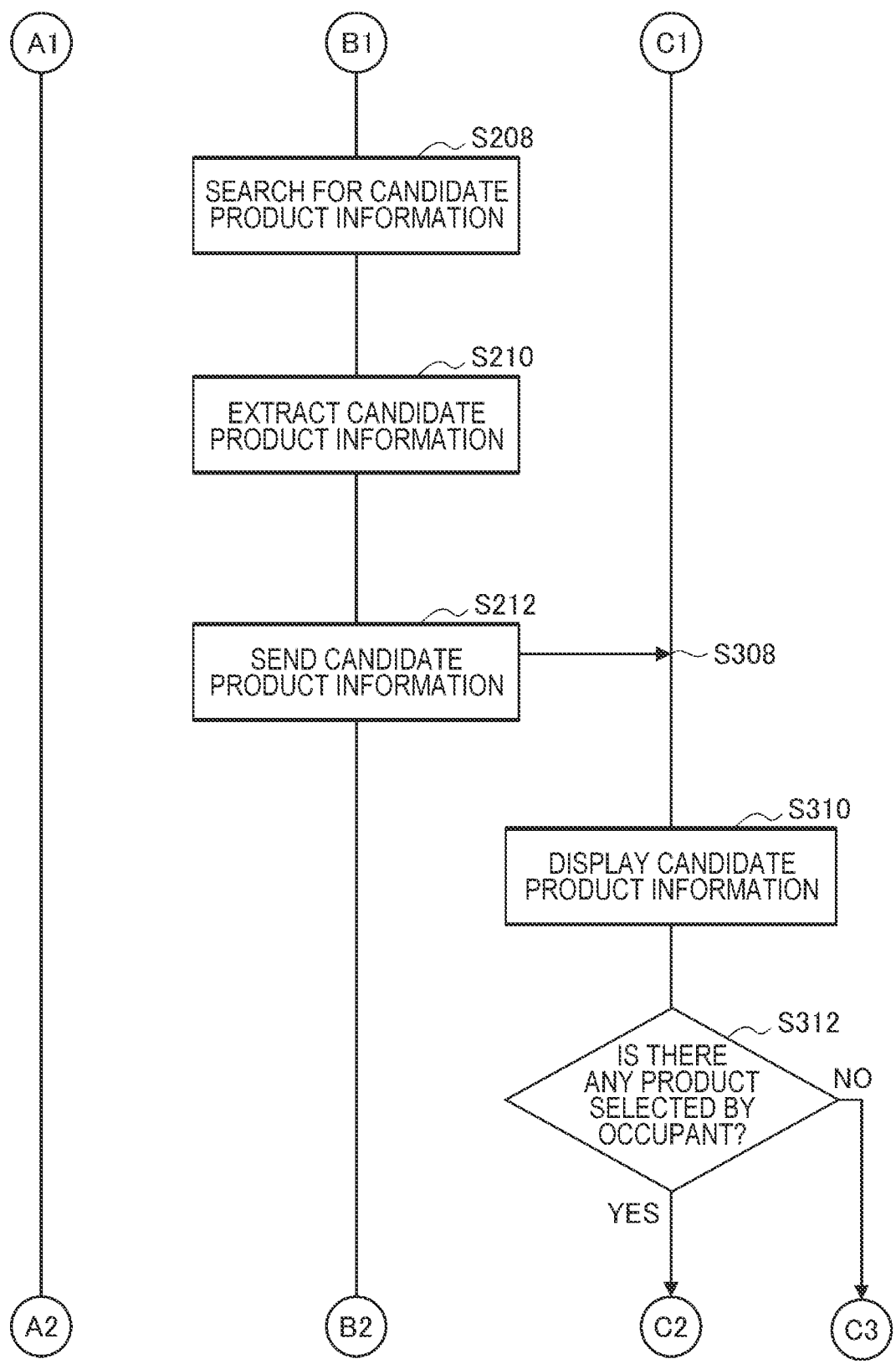
FIG. 14 is a second sequence diagram illustrating processing executed by the product purchase system according to the embodiment.
Figure 15:
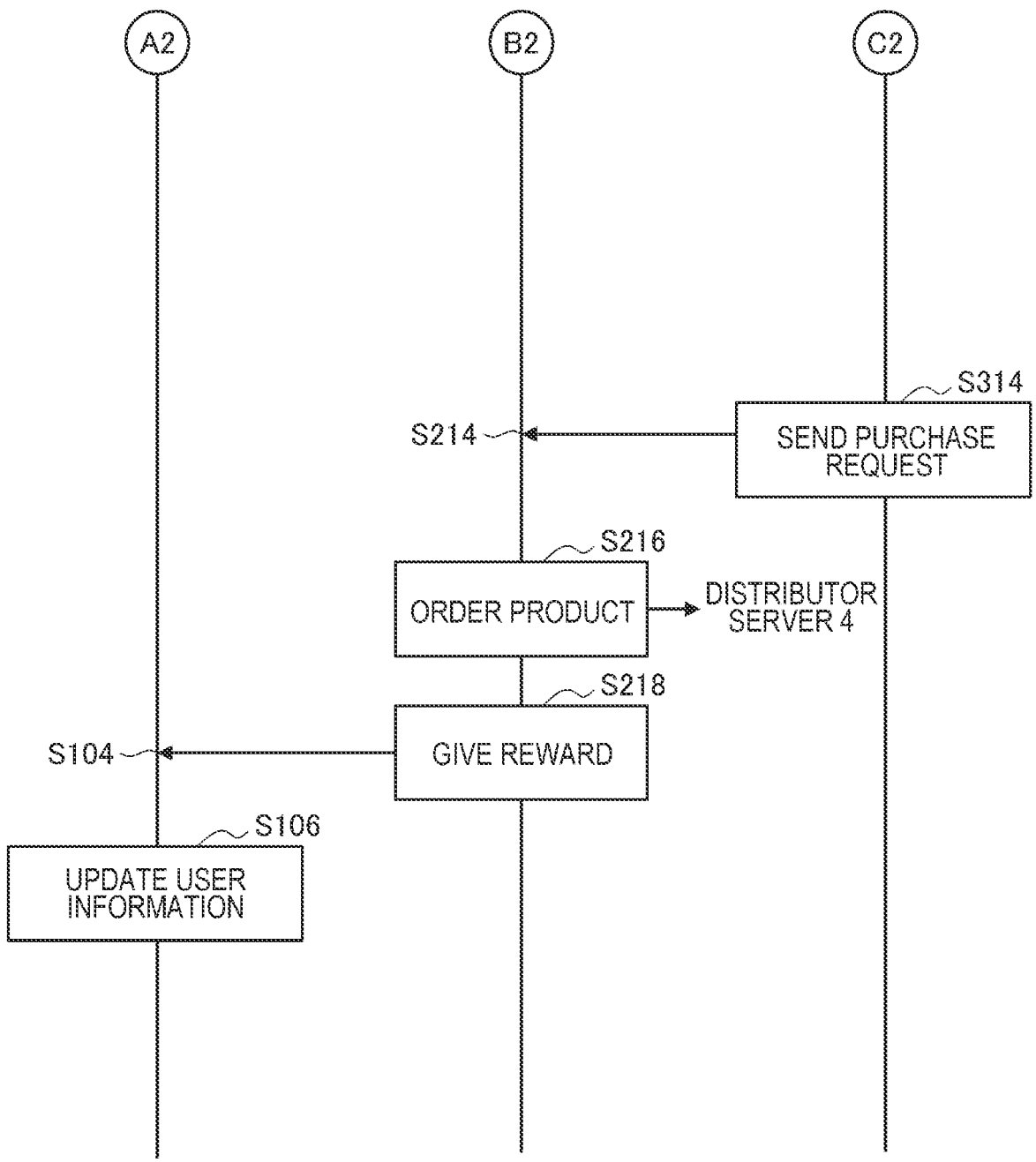
FIG. 15 is a third sequence diagram illustrating processing executed by the product purchase system according to the embodiment.
Figure 16:
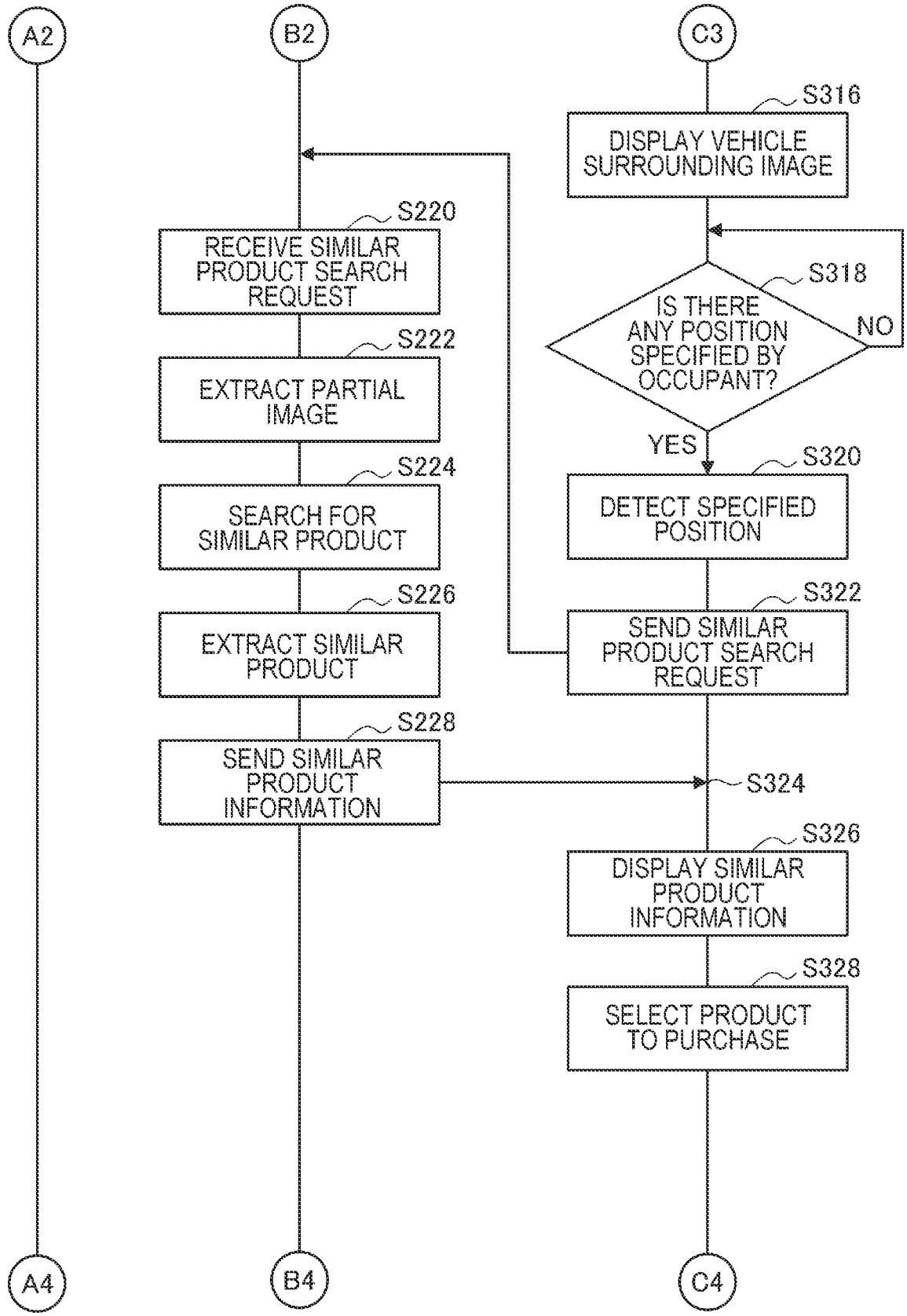
FIG. 16 is a fourth sequence diagram illustrating processing executed by the product purchase system according to the embodiment.
Figure 17:
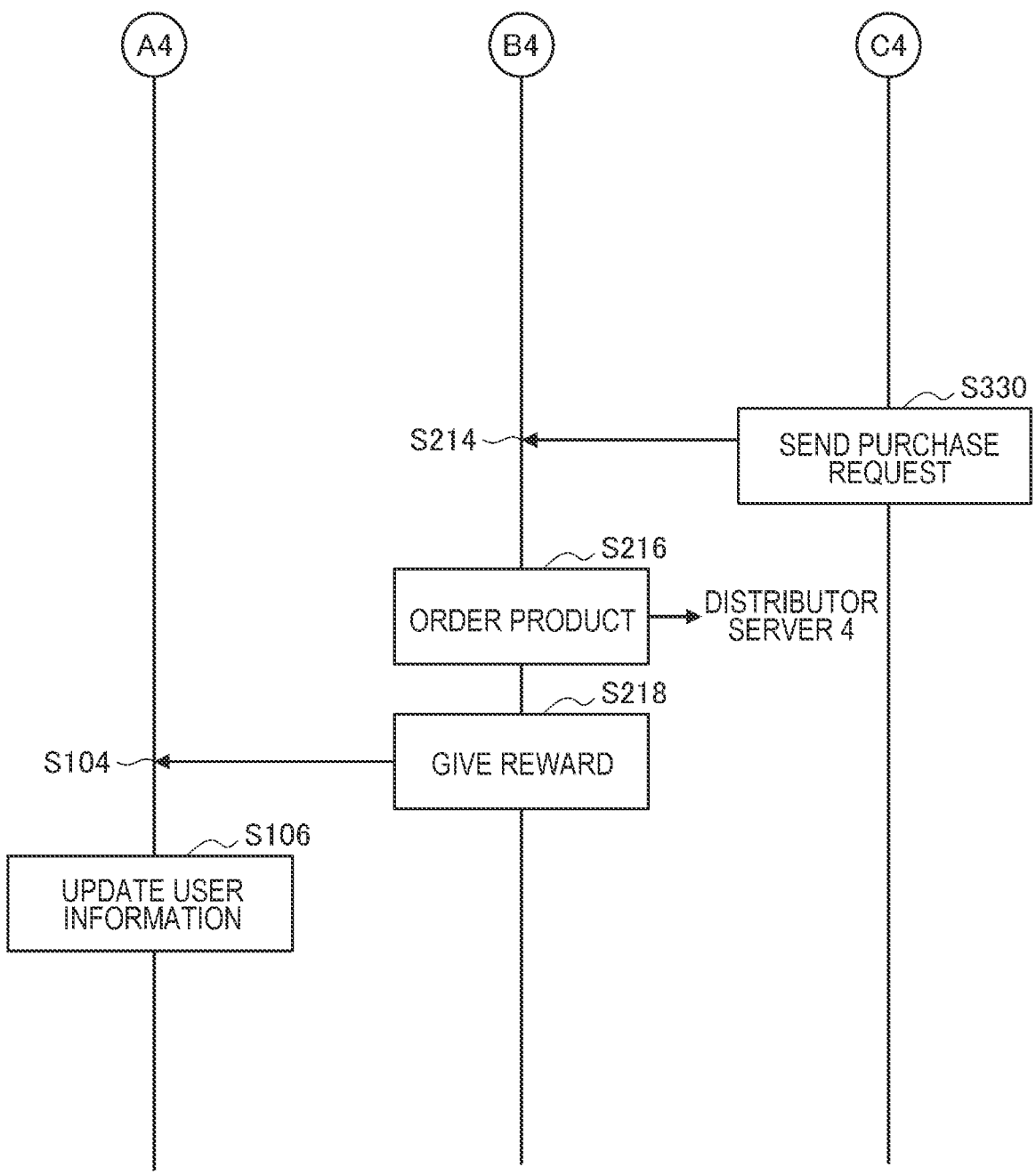
FIG. 17 is a fifth sequence diagram illustrating processing executed by the product purchase system according to the embodiment.

Processing executed by the product purchase system 1000 according to the embodiment will now be described below with reference to FIGS. 13 through 17. FIG. 13 is a first sequence diagram illustrating processing executed by the product purchase system 1000 according to the embodiment. FIG. 14 is a second sequence diagram illustrating processing executed by the product purchase system 1000 according to the embodiment. FIG. 15 is a third sequence diagram illustrating processing executed by the product purchase system 1000 according to the embodiment. FIG. 16 is a fourth sequence diagram illustrating processing executed by the product purchase system 1000 according to the embodiment. FIG. 17 is a fifth sequence diagram illustrating processing executed by the product purchase system 1000 according to the embodiment.

Reference will first be made to FIG. 13. In step S100, the first communication terminal 1 registers advertisement product information about a product worn or held by the advertising user 6 in an app installed in the first communication terminal 1, and sends the registered advertisement product information to the server 3. In step S102, the first communication terminal 1 sends time information obtained from the timer 102 and position information obtained from the GPS module 104 to the server 3 at certain regular intervals.

In step S200, the server 3 receives advertisement product information about a product worn or held by the advertising user 6 from the first communication terminal 1. In step S202, the server 3 also receives at regular intervals from the first communication terminal 1 position information indicating a certain position of the advertising user 6 while he/she is moving around and time information indicating the time when the advertising user 6 is located at this position. In one embodiment, the position information may serve as "first position information", while the time information may serve as "first time information". In step S204, the server 3 records and stores the position information, time information, advertisement product information received from the first communication terminal 1.

In step S300, while the vehicle 7 is moving, the second communication terminal 2 detects a specific action performed by the occupant 74 in the vehicle 7, which represents his/her intention to purchase a product worn or held by the advertising user 6 located around the vehicle 7. In step S302, the second communication terminal 2 records specific action information in the storage 210 by relating position information indicating the position of the vehicle 7 when a specific action is detected and time information indicating the time when the specific action is detected to each other. In one embodiment, the position information may serve as "second position information", while the time information may serve as "second time information".

In step S304, the second communication terminal 2 displays specific action information recorded in the storage 210 on the display of the second communication terminal 2. In step S304, the second communication terminal 2 also selects at least one item of specific action information as a result of the occupant 74 selecting at least one item of specific action information from among one or plural items of specific action information displayed on the display.

In step S306, when the specific action selector 214 has selected one or plural items of specific action information, the second communication terminal 2 generates a product search request by including position information and time information corresponding to the selected item of specific action information and sends the generated product search request to the server 3.

In step S206, the server 3 receives from the second communication terminal 2 the product search request including position information (second position information) indicating the position of the vehicle 7 when a specific action is detected and time information (second time information) indicating the time when the specific action is detected. Reference will be made to FIG. 14. In step S208, the server 3 searches the candidate product database 304 for advertisement product information, based on the position information and time information included in the received product search request.

In step S210, from among various items of advertisement product information stored in the candidate product database 304, the server 3 extracts one or plural items of candidate product information about one or plural candidate products corresponding to the position information and time information included in the product search request. In step S212, the server 3 sends the extracted one or plural items of candidate product information to the second communication terminal 2.

In step S308, the second communication terminal 2 receives one or plural candidate product information sent from the server 3 in response to the product search request. In step S310, the second communication terminal 2 displays the received one or plural items of candidate product information on the display. In step S312, the second communication terminal 2 also determines whether the occupant 74 has selected any product that he/she wishes to purchase.

Reference will be made to FIG. 15. If the occupant 74 has selected a product (YES in step S312), in step S314, the second communication terminal 2 generates a purchase request by including candidate product information corresponding to the selected product and sends the generated purchase request to the server 3.

In step S214, the server 3 receives the purchase request including candidate product information selected by the occupant 74 from the second communication terminal 2. In response to the purchase request, in step S216, the server 3 executes processing for ordering the product corresponding to the candidate product information from the distributor server 4. In response to the purchase request including candidate product information received from the second communication terminal 2, in step S218, the server 3 gives a reward to the advertising user 6 having registered advertisement product information corresponding to this candidate product information.

When a product is purchased based on advertisement product information registered in the app, the first communication terminal 1 receives reward information as advertising revenue from the server 3 in step S104. Upon receiving reward information, in step S106, the first communication terminal 1 updates user information related to the advertising user 6.

Reference will be made to FIG. 16. If the occupant 74 has not selected any product that he/she wishes to purchase (NO in step S312), the second communication terminal 2 displays a vehicle surrounding image 140 on the display in step S316. In one example, upon receiving information that there is no product that the occupant 74 wishes to purchase among the items of candidate product information displayed on the display, the second communication terminal 2 displays a vehicle surrounding image 140 corresponding to the specific action information selected by the occupant 74 on the display. Then, in step S318, the second communication terminal 2 determines whether the occupant 74 has specified any position within the vehicle surrounding image 140.

If a position is specified by the occupant 74, in step S320, the second communication terminal 2 determines the specified position as the display position of the product that the occupant 74 wishes to purchase. Then, in step S322, the second communication terminal 2 generates a similar product search request by including specified position information indicating the detected display position and at least part of the vehicle surrounding image 140. In step S322, the server 3 sends the generated similar product search request to the server 3.

In step S220, the server 3 receives from the second communication terminal 2 the similar product search request including at least part of the vehicle surrounding image 140 and specified position information indicating the display position of the product specified by the occupant 74 within the vehicle surrounding image 140. In step S222, based on the specified position information, the server 3 identifies the display position of the product that the occupant 74 wishes to purchase within the vehicle surrounding image 140. In step S222, the server 3 then extracts a partial image within a certain range from the identified display position.

In step S224, the server 3 compares the partial image with product images indicated by many items of product information stored in the similar product database 314 and then searches for products identical to or similar to the product image included in the partial image. In step S226, from among plural items of product information stored in the similar product database 314, the server 3 extracts one or plural items of similar product information indicating one or plural products identical to or similar to the product specified by the occupant 74. In step S228, the server 3 sends the extracted one or plural items of similar product information to the second communication terminal 2.

In step S324, the second communication terminal 2 receives one or plural items of similar product information sent from the server 3 in response to the similar product search request. In step S326, the second communication terminal 2 displays the received one or plural items of similar product information on the display. In step S328, the second communication terminal 2 selects at least one item of similar product information as a result of the occupant 74 selecting at least one item of similar product information among one or plural items of similar product information displayed on the display. The selected similar product information is information on the product that the occupant 74 wishes to purchase.

Reference will be made to FIG. 17. When the product is selected by the occupant 74 in step S328, in step S330, the second communication terminal 2 generates a purchase request by including similar product information about a similar product corresponding to the product selected by the occupant 74 and sends the generated purchase request to the server 3. After step S330, the same processing operations as steps S214, S216, S218, S104, and S106 discussed with reference to FIG. 15 are executed.

The processing operations executed by the first communication terminal 1, the server 3, and the second communication terminal 2 in the product purchase system 1000 according to the embodiment have been discussed with reference to FIGS. 13 through 17. The processing operation executed by each of the first communication terminal 1, the server 3, and the second communication terminal 2 is implemented as a result of installing a program for describing a corresponding processing operation in a corresponding one of the first communication terminal 1, the server 3, and the second communication terminal 2, for example.

As described above, according to the embodiment, a product purchase system including a first communication terminal, a second communication terminal, and a server is provided. The first communication terminal is carried by an advertising user. The advertising user serves as a human billboard that advertises a product. The second communication terminal is provided to be movable with a vehicle. The first communication terminal, the second communication terminal, and the server are coupled to each other via a network so as to communicate with each other. The first communication terminal sends first position information, first time information, and advertisement product information to the server. The first position information indicates a position of the advertising user while the advertising user is moving around. The first time information indicates a clock time when the advertising user is located at this position. The advertisement product information indicates a product worn or held by the advertising user. The server receives the first position information, the first time information, and the advertisement product information from the first communication terminal. The server stores the first position information, the first time information, and the advertisement product information received from the first communication terminal in a database by relating these items of information to each other. The second communication terminal detects a specific action performed by an occupant in the vehicle while the vehicle is moving. The specific action represents an intention of the occupant to purchase a product worn or held by the advertising user located around the vehicle. The second communication terminal records specific action information including second position information and second time information by relating the second position information and the second time information to each other. The second position information indicates a position of the vehicle when the specific action is detected. The second time information indicates a clock time when the specific action is detected. The specific action information is recorded for each specific action. The second communication terminal sends a product search request to the server when the occupant has selected at least one item of the specific action information from one or plural items of the recorded specific action information. The product search request includes the second position information and the second time information corresponding to the selected at least one item of the specific action information. The server receives the product search request from the second communication terminal. Based on the second position information and the second time information included in the product search request, the server searches the database for the advertisement product information and extracts, from the advertisement product information, candidate product information indicating one or plural candidate products corresponding to the second position information and the second time information. The server sends the extracted candidate product information to the second communication terminal. The second communication terminal receives the candidate product information from the server and displays the received candidate product information on a display.

According to the embodiment, a product purchase system including a first communication terminal, a second communication terminal, and a server is provided. The first communication terminal is carried by an advertising user. The advertising user serves as a human billboard that advertises a product. The second communication terminal is provided to be movable with a vehicle. The first communication terminal, the second communication terminal, and the server are coupled to each other via a network so as to communicate with each other.

The first communication terminal includes at least one first processor and at least one first memory coupled to the at least one first processor. The at least one first processor executes a process. The process includes sending first position information, first time information, and advertisement product information to the server. The first position information indicates a position of the advertising user while the advertising user is moving around. The first time information indicates a clock time when the advertising user is located at this position. The advertisement product information indicates a product worn or held by the advertising user. The server includes at least one second processor and at least one second memory coupled to the at least one second processor. The at least one second processor executes a process. The process includes receiving the first position information, the first time information, and the advertisement product information from the first communication terminal. The process includes storing the first position information, the first time information, and the advertisement product information received from the first communication terminal in a database by relating these items of information to each other. The second communication terminal includes at least one third processor and at least one third memory coupled to the at least one third processor. The at least one third processor executes a process. The process includes detecting a specific action performed by an occupant in the vehicle while the vehicle is moving. The specific action represents an intention of the occupant to purchase a product worn or held by the advertising user located around the vehicle. The process includes recording specific action information including second position information and second time information by relating the second position information and the second time information to each other. The second position information indicates a position of the vehicle when the specific action is detected. The second time information indicates a clock time when the specific action is detected. The specific action information is recorded for each specific action. The process includes sending a product search request to the server when at least one item of the specific action information is selected by the occupant from one or plural items of the recorded specific action information. The product search request includes the second position information and the second time information corresponding to the selected at least one item of the specific action information. The at least one second processor of the server executes a process. The process includes receiving the product search request from the second communication terminal. The process includes searching the database for the advertisement product information and extracting, from the advertisement product information, candidate product information indicating one or plural candidate products corresponding to the second position information and the second time information, based on the second position information and the second time information included in the product search request. The process includes sending the extracted candidate product information to the second communication terminal. The at least one third processor of the second communication terminal executes a process. The process includes receiving the candidate product information from the server and displaying the received candidate product information on a display.

With the above-described configurations, the time and the position at which the occupant 74 has found a product that he/she wishes to purchase can be recorded. Based on the recorded time and position, matching between the product found by the occupant 74 and the advertisement product registered by the advertising user 6 can be performed. If these two products match each other, the product can be provided to the occupant 74. It is thus possible to assist the occupant 74 in a vehicle in purchasing a product that the occupant happens to see during driving. The occupant 74 can obtain the product without depending on his/her memory about the product. Since only time information and position information used for specifying a product are recorded, the capacity of the storage 210 can be saved, and the time and the effort in searching for the time information and position information can also be saved.

An external-environment imaging device that images an outside environment around the vehicle may be disposed in the vehicle. When the specific action is detected while the vehicle is moving, the second communication terminal may record the specific action information by relating the second position information, the second time information, and a vehicle surrounding image captured by the external-environment imaging device to each other.

With this configuration, when the occupant 74 has found a product that he/she wishes to purchase, an image around the vehicle 7 can be obtained without the occupant 74 using a camera. If the occupant 74 is a driver, he/she can concentrate on driving without using a camera, thereby leading to safe driving. When an image around the vehicle 7 is captured by the external-environment imaging device 71, the faces included in the image may be automatically pixelated or blurred out. Then, image capturing with the external-environment imaging device 71 is less likely to cause some trouble.

In a case where the occupant has selected a product that the occupant wishes to purchase from one or plural candidate products indicated by the candidate product information displayed on the display, the second communication terminal may execute purchase processing for the product. In a case where information indicating that there is no product that the occupant wishes to purchase from one or plural candidate products indicated by the candidate product information displayed on the display is input, the second communication terminal may display on the display the vehicle surrounding image corresponding to the specific action information selected by the occupant. The second communication terminal may also send a similar product search request including specified position information and at least part of the vehicle surrounding image to the server. The specified position information indicates a display position of a product specified by the occupant within the displayed vehicle surrounding image. Based on the specified position information and the at least part of the vehicle surrounding image included in the similar product search request received from the second communication terminal, the server may search the database, extract similar product information indicating one or plural similar products which are identical to or similar to the product specified by the occupant, and send the extracted similar product information to the second communication terminal. The second communication terminal may display the similar product information received from the server on the display.

With this configuration, even if the product that the occupant 74 wishes to purchase and the advertisement product registered by the advertising user 6 do not match, products identical to or similar to the product desired by the occupant 74 can be provided to the occupant 74.

A microphone that collects voice in the vehicle may be disposed in at least one of the vehicle or the second communication terminal. The second communication terminal may detect a specific remark of the occupant as the specific action, based on voice data indicating voice collected by the microphone. The specific remark represents an intention of the occupant to purchase a product worn or held by the advertising user located around the vehicle.

With this configuration, based on a specific keyword, a timing at which the occupant 74 has expressed his/her intention to purchase a product can be detected, thereby enhancing the accuracy of such a timing.

An internal-environment imaging device that images the inside of the vehicle may be disposed in the vehicle. The second communication terminal may detect a specific gesture or a motion of a line of sight of the occupant as the specific action, based on image data indicating an image of the occupant captured by the internal-environment imaging device. The specific gesture and the motion of a line of sight each represent an intention of the occupant to purchase a product worn or held by the advertising user located around the vehicle.

With this configuration, based on a specific gesture or the motion of a line of sight of the occupant 74, a timing at which the occupant 74 has expressed his/her intention to purchase a product can be detected. It is thus possible to detect a timing at which the occupant 74 has focused on a product that the occupant 74 wishes to purchase, thereby enhancing the accuracy of such a timing.

At least one of a set of plural microphones that collect voice in the vehicle or an internal-environment imaging device that images the inside of the vehicle may be disposed in the vehicle. The second communication terminal may specify a focusing direction of the occupant having performed the specific action, based on at least one of voice data indicating voice collected by the set of plural microphones or image data indicating an image of the occupant captured by the internal-environment imaging device. The second communication terminal may send the product search request to the server by adding direction information indicating the specified focusing direction to the second position information and the second time information. The server may extract the candidate product information, based on the first position information, the second position information, and the direction information.

This configuration makes it possible to specify a focusing direction of the occupant 74 around the vehicle 7. Precise matching can thus be performed between the product that the occupant 74 wishes to purchase and the advertisement product registered by the advertising user 6.

The disclosure has been discussed through illustration of the embodiment with reference to the accompanying drawings. However, the disclosure is not restricted to the embodiment. Obviously, many modifications and variations will be apparent to practitioners skilled in the art without departing from the scope and spirit of the disclosure and it is understood that such modifications and variations are also encompassed in the technical scope of the disclosure.

Processing operations executed by the devices (the first communication terminal 1, second communication terminal 2, and server 3, for example) in the above-described embodiment may be implemented by any of software, hardware, or combination of software and hardware. If a processing operation executed by a device is implemented by a software program, this program is stored in advance in a non-transitory storage medium provided inside or outside of the device. The program is read from the non-transitory storage medium, such as a ROM, into a transitory storage medium, such as a RAM, and is executed by a processor, such as a CPU.

For each function of each of the above-described devices, a program for implementing a function may be created and be installed into a computer of a corresponding device. As a result of a processor of the computer executing a program stored in a memory, a corresponding function is executed. When executing the program, multiple processors may execute the program in a distributed manner or one processor execute the program. Each function of each of the above-described devices may be implemented by cloud computing using multiple computers coupled to each other via a communication network.

A program may be distributed from an external device via a communication network and be provided and installed into the computer of a corresponding device. A program may be recorded on a non-transitory computer readable medium and be provided and installed into the computer of a corresponding device.

In the above-described embodiment, for each function of each of the above-described devices, a program for executing a function can be provided. A non-transitory computer readable medium storing this program can also be provided. The non-transitory computer readable medium may be a disk recording medium, such as an optical disc, a magnetic disk, or a magneto-optical disk, or a semiconductor memory, such as a flash memory or a universal serial bus (USB) memory.

In an embodiment of the disclosure, it is possible to assist an occupant in a vehicle in purchasing a product worn or held by a person that the occupant happens to see during driving.

The first communication terminal 1 illustrated in FIG. 5, the second communication terminal 2 illustrated in FIG. 7, and the server 3 illustrated in FIG. 12 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the first communication terminal 1 including the timer 102, the GPS module 104, the advertisement product register 106, the storage 108, the sender 110, the receiver 112, and the updater 114, the second communication terminal 2 including the built-in microphone 202, the timer 204, the GPS module 206, the specific action detector 208, the storage 210, the specific action display 212, the specific action selector 214, the product search request generator 216, the sender 218, the receiver 220, the candidate product display 222, the candidate product selector 224, the vehicle-surrounding image display 226, the specified position detector 228, the similar product search request generator 230, the similar product display 232, the purchase product selector 234, and the purchase processor 236, and the server 3 including the receiver 302, the candidate product database 304, the candidate product searcher 306, the candidate product extractor 308, the sender 310, the similar product searcher 312, the similar product database 314, the similar product extractor 316, the purchase processor 318, and the reward giver 320. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 5, 7, and 12.

The invention claimed is:

1. A product purchase system comprising:
a first communication terminal configured to be carried by an advertising user, the advertising user serving as a human billboard that advertises a product worn or held by the advertising user;
a second communication terminal provided to be movable with a vehicle and comprising at least one of an internal-environment imaging device configured to capture an image of an interior of the vehicle or a microphone configured to capture audio within the vehicle; and
a server,
the first communication terminal, the second communication terminal, and the server being capable of coupling to each other via a network so as to communicate with each other, wherein
the first communication terminal is configured to
send first position information, first time information, and advertisement product information to the server, the first position information indicating a position of the advertising user while the advertising user is moving around, the first time information indicating a clock time when the advertising user is located at the position, the advertisement product information indicating the product, the server is configured to
receive the first position information, the first time information, and the advertisement product information from the first communication terminal, and
store, in a database, the first position information, the first time information, and the advertisement product information received from the first communication terminal while relating the first position information, the first time information, and the advertisement product information to each other,
the second communication terminal is configured to
detect, via the at least one of the internal-environment imaging device or the microphone, specific actions performed by an occupant in the vehicle while the vehicle is moving, each of the specific actions representing an intention of the occupant to purchase the product worn or held by the advertising user located around the vehicle, each of the specific actions comprising one of a specific remark that is captured by the microphone, a specific gesture that is captured by the internal-environment imaging device, or a specific motion of a line of sight of the occupant that is captured by the internal-environment imaging device,
record specific action information pieces each including second position information and second time information while relating the second position information and the second time information to each other, the second position information indicating a position of the vehicle when a corresponding one of the specific actions is detected, the second time information indicating a clock time when the corresponding one of the specific actions is detected, each of the specific action information pieces being recorded for the corresponding one of the specific actions, and
generate and send a product search request to the server in response to the occupant selecting at least one of the recorded specific action information pieces, the product search request including the second position information and the second time information corresponding to the selected at least one of the specific action information pieces,
the server is configured to
receive the product search request from the second communication terminal,
based on the second position information and the second time information included in the product search request, search the advertisement product information stored in the database and extract, from the advertisement product information, candidate product information indicating one or more candidate products corresponding to the second position information and the second time information, and
send the extracted candidate product information to the second communication terminal, and
the second communication terminal is configured to
receive the candidate product information from the server, and
display the received candidate product information on a display.

2. The product purchase system according to claim 1, wherein:
an external-environment imaging device is disposed in the vehicle, the external-environment imaging device being configured to capture a vehicle surrounding image that is an image of an outside environment around the vehicle; and the second communication terminal is configured to record each of the specific action information pieces while relating the second position information, the second time information, and the vehicle surrounding image to each other in response to the corresponding one of the specific actions being detected while the vehicle is moving.

3. The product purchase system according to claim 2, wherein:

the occupant selecting a first desired product that the occupant wishes to purchase from the one or more candidate products indicated by the candidate product information displayed on the display, the second communication terminal is configured to execute purchase processing for the first desired product; and in response to the second communication terminal receiving information indicating that there is no desired product that the occupant wishes to purchase from the one or more candidate products indicated by the candidate product information displayed on the display, the second communication terminal is configured to display on the display the vehicle surrounding image corresponding to the at least one of the specific action information pieces selected by the occupant, and send a similar product search request including selection position information and at least part of the vehicle surrounding image to the server, the selection position information indicating a display position of a second desired product selected by the occupant within the displayed vehicle surrounding image, the server is configured to search the database and extract similar product information indicating one or more similar products that are identical to or similar to the second desired product, based on the selection position information and the at least part of the vehicle surrounding image included in the similar product search request received from the second communication terminal, and send the extracted similar product information to the second communication terminal, and the second communication terminal is configured to display the similar product information received from the server on the display.

4. The product purchase system according to claim 1, wherein:

one or both of the vehicle and the second communication terminal comprising the microphone configured to collect voice in the vehicle; and the second communication terminal is configured to detect the specific remark of the occupant as one of the specific actions, based on voice data indicating voice collected by the microphone, the specific remark representing an intention of the occupant to purchase the product worn or held by the advertising user located around the vehicle.

5. The product purchase system according to claim 2, wherein:

one or both of the vehicle and the second communication terminal comprising the microphone configured to collect voice in the vehicle; and the second communication terminal is configured to detect the specific remark of the occupant as one of the specific actions, based on voice data indicating voice collected by the microphone, the specific remark representing an intention of the occupant to purchase the product worn or held by the advertising user located around the vehicle.

6. The product purchase system according to claim 3, wherein:

one or both of the vehicle and the second communication terminal comprising the microphone configured to collect voice in the vehicle; and the second communication terminal is configured to detect the specific remark of the occupant as one of the specific actions, based on voice data indicating voice collected by the microphone, the specific remark representing an intention of the occupant to purchase the product worn or held by the advertising user located around the vehicle.

7. The product purchase system according to claim 1, wherein:

the vehicle comprising an internal-environment imaging device configured to capture the image of the inside of the vehicle; and the second communication terminal is configured to detect, as the specific action, the a specific gesture of the occupant or the specific motion of the line of sight of the occupant based on image data indicating an image of the occupant captured by the internal-environment imaging device, the specific gesture and the specific motion of the line of sight each representing an intention of the occupant to purchase the product worn or held by the advertising user located around the vehicle.

8. The product purchase system according to claim 2, wherein:

the vehicle comprising the internal-environment imaging device configured to capture the image of the inside of the vehicle; and the second communication terminal is configured to detect, as the specific action, the specific gesture of the occupant or the specific motion of the line of sight of the occupant based on image data indicating an image of the occupant captured by the internal-environment imaging device, the specific gesture and the specific motion of the line of sight each representing an intention of the occupant to purchase the product worn or held by the advertising user located around the vehicle.

9. The product purchase system according to claim 3, wherein:

the vehicle comprising the internal-environment imaging device configured to capture the image of the inside of the vehicle; and the second communication terminal is configured to detect, as the specific action, the specific gesture of the occupant or the specific motion of the line of sight of the occupant based on image data indicating an image of the occupant captured by the internal-environment imaging device, the specific gesture and the specific motion of the line of sight each representing an intention of the occupant to purchase the product worn or held by the advertising user located around the vehicle.

10. The product purchase system according to claim 1, wherein:

the vehicle comprises one or both of the internal-environment imaging device and one or more microphones, the internal-environment imaging device being configured to capture the image of the inside of the vehicle, the one or more microphones configured to collect voice in the vehicle;

the second communication terminal is configured to
identify a focusing direction of the occupant having performed one of the specific actions, based on one or both of image data indicating an image of the occupant captured by the internal-environment imaging device and voice data indicating voice collected by the one or more microphones, and
send the product search request to the server while adding direction information indicating the identified focusing direction to the second position information and the second time information; and the server is configured to extract the candidate product information, based on the first position information, the second position information, and the direction information.

11. The product purchase system according to claim 2, wherein:

the vehicle comprises one or both of the internal-environment imaging device and one or more microphones, the internal-environment imaging device being configured to capture the image of the inside of the vehicle, the one or more microphones configured to collect voice in the vehicle;

the second communication terminal is configured to
identify a focusing direction of the occupant having performed one of the specific actions, based on one or both of image data indicating an image of the occupant captured by the internal-environment imaging device and voice data indicating voice collected by the one or more microphones, and
send the product search request to the server while adding direction information indicating the identified focusing direction to the second position information and the second time information; and the server is configured to extract the candidate product information, based on the first position information, the second position information, and the direction information.

12. The product purchase system according to claim 3, wherein:

the vehicle comprises one or both of the internal-environment imaging device and one or more microphones, the internal-environment imaging device being configured to capture the image of the inside of the vehicle, the one or more microphones configured to collect voice in the vehicle;

the second communication terminal is configured to
identify a focusing direction of the occupant having performed one of the specific actions, based on one or both of image data indicating an image of the occupant captured by the internal-environment imaging device and voice data indicating voice collected by the one or more microphones, and
send the product search request to the server while adding direction information indicating the identified focusing direction to the second position information and the second time information; and the server is configured to extract the candidate product information, based on the first position information, the second position information, and the direction information.

13. A server that is configured be coupled to a first communication terminal and a second communication terminal via a network so as to communicate with the first communication terminal and the second communication terminal, the first communication terminal being to be carried by an advertising user, the advertising user serving as a human billboard that advertises a product worn or held by the advertising user, the second communication terminal being provided to be movable with a vehicle, the server comprising:
at least one processor; and
at least one memory coupled to the at least one processor,
the at least one processor executing a process, the process comprising:
receiving first position information, first time information, and advertisement product information from the first communication terminal, the first position information indicating a position of the advertising user while the advertising user is moving around, the first time information indicating a clock time when the advertising user is located at the position, the advertisement product information indicating the product;
storing, in a database, the first position information, the first time information, and the advertisement product information received from the first communication terminal while relating the first position information, the first time information, and the advertisement product information to each other;
receiving a product search request including second position information and second time information from the second communication terminal, the second position information indicating a position of the vehicle when a specific action performed by an occupant in the vehicle is detected while the vehicle is moving, the specific action representing an intention of the occupant to purchase the product worn or held by the advertising user located around the vehicle, the specific action comprising one of a specific remark that is captured by a microphone, a specific gesture that is captured by an internal-environment imaging device, or a specific motion of a line of sight of the occupant that is captured by the internal-environment imaging device, the second time information indicating a clock time when the specific action is detected;
based on the second position information and the second time information included in the product search request, searching the advertisement product information in the database and extracting, from the advertisement product information, candidate product information indicating one or more candidate products corresponding to the second position information and the second time information; and
sending the extracted candidate product information to the second communication terminal.

14. A second communication terminal that configured to be coupled to a server via a network so as to communicate with the server and is provided to be movable with a vehicle, the server being configured to be coupled to a first communication terminal that is configured to be carried by an advertising user, the advertising user serving as a human billboard that advertises a product worn or held by the advertising user, the second communication terminal comprising:
at least one processor; and
at least one memory coupled to the at least one processor,
the at least one processor executing a process, the process comprising:

detecting specific actions performed by an occupant in the vehicle while the vehicle is moving, each of the specific actions representing an intention of the occupant to purchase the product worn or held by the advertising user located around the vehicle, each specific action comprising one of a specific remark that is captured by a microphone, a specific gesture that is captured by an internal-environment imaging device, or a specific motion of a line of sight of the occupant that is captured by the internal-environment imaging device;

recording specific action information pieces each including position information and time information while relating the position information and the time information to each other, the position information indicating a position of the vehicle when a corresponding one of the specific actions is detected, the time information indicating a clock time when the corresponding one of the specific actions is detected, each of the specific action information pieces being recorded for the corresponding one of the specific actions;

sending a product search request to the server in response to the occupant selecting at least one of the recorded specific action information pieces, the product search request including the position information and the time information corresponding to the selected at least one of the specific action information pieces;

receiving candidate product information from the server, the candidate product information indicating one or more candidate products corresponding to the position information and the time information included in the product search request; and displaying the received candidate product information on a display.

* * * * *